US007957863B2

(12) United States Patent
Nakajima et al.

(10) Patent No.: US 7,957,863 B2
(45) Date of Patent: Jun. 7, 2011

(54) VEHICLE INFORMATION RECORDING APPARATUS, PROGRAM, AND RECORDING MEDIUM

(75) Inventors: Kazunari Nakajima, Kobe (JP); Tetuya Uetani, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 854 days.

(21) Appl. No.: 11/979,922

(22) Filed: Nov. 9, 2007

(65) Prior Publication Data

US 2008/0161995 A1 Jul. 3, 2008

(30) Foreign Application Priority Data

Nov. 10, 2006 (JP) ................................ 2006-306035
Oct. 5, 2007 (JP) ................................ 2007-262646

(51) Int. Cl.
*G01M 17/00* (2006.01)

(52) U.S. Cl. ........................................................ 701/35

(58) Field of Classification Search ..................... 701/35
See application file for complete search history.

(56) References Cited

U.S. PATENT DOCUMENTS 6,463,373 B2 * 10/2002 Suganuma et al. ............. 701/48
6,678,586 B2 * 1/2004 Nakamoto et al. ................ 701/1
6,741,896 B1 * 5/2004 Olzak et al. ..................... 700/82
6,900,912 B1 5/2005 Miyake
6,968,268 B2 * 11/2005 Yamada et al. ............... 701/111
7,266,724 B2 * 9/2007 Denda et al. .................... 714/24
2002/0040261 A1 * 4/2002 Nakamoto et al. ................ 701/1
2002/0099487 A1 * 7/2002 Suganuma et al. ............. 701/48
2005/0187681 A1 * 8/2005 Suzuki et al. ................... 701/29
2006/0200276 A1 * 9/2006 Sayama et al. .................... 701/1
2008/0088482 A1 * 4/2008 Okada et al. .................. 340/937

FOREIGN PATENT DOCUMENTS

EP 1 662 399 A1 5/2006
JP A-2000-006854 1/2000
JP A-2001-144921 5/2001
JP A-2003-002256 1/2003
JP A-2003-252256 9/2003
JP A-2006-127206 5/2006
WO WO 2005/024634 A1 3/2005

* cited by examiner

*Primary Examiner* — Thomas G Black
*Assistant Examiner* — Shelley Chen
(74) *Attorney, Agent, or Firm* — Oliff & Berridge PLC

(57) ABSTRACT

There is provided a vehicle information recording apparatus capable of making a user easily recognize vehicle information which is recorded in the presence of electric power supply from a backup power source. When a vehicle is involved in an accident and the impact caused by the accident has triggered the interruption of electric power supply from a vehicle power source section and thereupon electrical power is supplied from a backup power source section, predetermined identification information "-A" is added to a folder name of a vehicle power source folder where still image information is recorded in the presence of electric power supply from the vehicle power source section, whereby a backup power source folder is created on a CF card as a new folder. Part of still image information stored in a second SD-RAM is recorded in the backup power source folder created on the CF card.

6 Claims, 15 Drawing Sheets

VEHICLE INFORMATION RECORDING APPARATUS, PROGRAM, AND RECORDING MEDIUM

BACKGROUND OF THE INVENTION

1. Field of the Invention

The present invention relates to a vehicle information recording apparatus for recording vehicle information concerning a vehicle such as image information taken by a camera mounted in a vehicle and for recording the vehicle information on a recording medium on the basis of the condition of the vehicle, for example. The invention further relates to a program for allowing a computer to execute functions of the vehicle information recording apparatus, and to a recording medium that sores the program.

2. Description of the Related Art

As a vehicle information recording apparatus of related art, there is known an apparatus in which image information taken by a camera mounted in a vehicle is recorded in a cyclic manner in a first memory such as a ring buffer memory, and in which, in the event of the vehicle being involved in an accident, the accident triggers recording of the recorded information on a plurality of images in a second memory such as a compact flash (registered trademark) card (hereinafter, occasionally referred to as a "CF card"). In the vehicle information recording apparatus as has been described, the information on the plurality of images is recorded in the first memory in an endless manner, so that image information acquired immediately before the accident can also be recorded in the second memory (for example, refer to Japanese Unexamined Patent Publication JP-A 2000-006854).

In the vehicle information recording apparatus of related art, in the event of the vehicle being involved in an accident, the accident triggers the recording, in a folder created in the second memory, of the image information which is taken by the camera and recorded in the first memory. In the vehicle information recording apparatus, the image information recorded in the aforementioned first memory is recorded in the second memory with use of electric power supplied from a vehicle power source. However, in the event of the vehicle, for example, being involved in an accident, the electric power supply from the vehicle power source is interrupted due to the impact caused by the accident, whereupon electric power is supplied from a backup power source. And the image information recorded in the aforementioned first memory is recorded in the folder created in the second memory, with use of the electric power supplied from the backup power source.

In the vehicle information recording apparatus of related art, the image information recorded in the first memory in the presence of electric power supply from the vehicle power source and the image information recorded in the first memory in the presence of electric power supply from the backup power source are not distinguished from each other, and are recorded in a mixed manner in the same folder created in the second memory. Accordingly, in the case of displaying, out of information on a plurality of images which is recorded in the folder created in the second memory and then is loaded into a personal computer (PC for short), image information recorded in the first memory in the presence of electric power supply from the backup power source, a user must check all image information loaded into the PC, whereby to search for the image information recorded in the first memory in the presence of the electric power supply from the backup power source. Therefore, this causes such problems that it takes a lot of troubles in the searching operation and that the image information recorded in the first memory cannot be promptly recognized.

In addition, as described above, the image information recorded in the first memory in the presence of electric power supply from the backup power source is the information that the user needs. That is, the switch in electric power supply from the vehicle power source to the backup power source can be considered to be induced by the application, on the vehicle, of an impact by which the connection between the vehicle information recording apparatus and the vehicle power source can be cut off. And in order to grasp the condition of the impact thoroughly, there has been required an apparatus by which the image information recorded in the first memory in the presence of electric power supply from the aforementioned backup power source can be so recorded in the second memory that the user can easily recognize the information thus recorded.

SUMMARY OF THE INVENTION

An object of the invention is to provide a vehicle information recording apparatus capable of allowing a user to easily recognize vehicle information recorded with electric power coming from a backup power source, a program for allowing a computer to execute such a function of the vehicle information recording apparatus, and a recording medium that stores the program.

According to the invention, vehicle information concerning a vehicle is recorded in a cyclic manner in a first memory. A recording control section effects recording of the vehicle information recorded in the first memory into a second memory every time a predetermined condition is fulfilled. Electric power is supplied from a main power source section to the recording control section. An auxiliary power source section acts as a backup for the electric power supply from the main power source section to the recording control section. Under the control of the recording control section, the vehicle information recorded in the first memory is so recorded in the second memory so that it is possible to discriminate whether certain vehicle information has been recorded in the second memory with use of electric power supplied from the main power source section or from the auxiliary power source section.

According to the invention, a vehicle information recording apparatus is such constituted that when, in the event of the vehicle being involved in an accident, the impact caused by the accident induces interruption of electric power supply from the main power source section to the recording control section and thereupon electric power is supplied from the auxiliary power source section, the vehicle information recorded in the first memory is so recorded in the second memory so that it is possible to discriminate that the vehicle information has been recorded in the second memory with use of electric power supplied from the auxiliary power source section.

Accordingly, in a case where plural pieces of vehicle information recorded in the second memory are loaded into, for example, a personal computer (PC for short) and where on a display screen of the PC is displayed, out of the plural pieces of vehicle information loaded into the PC, vehicle information which has been recorded on the second memory with use of electric power supplied from the auxiliary power source section, the user can easily and promptly discriminate whether certain vehicle information is the vehicle information recorded with use of electric power supplied from the main power source section or the vehicle information recorded with use of electric power supplied from the auxiliary power source section, by only identifying the plural pieces of loaded vehicle information by the eye. In this way, the user can easily make a confirmation by checking the display screen where is displayed the vehicle information recorded with use of electric power supplied from the auxiliary power source section.

Further, unlike the related art described above, the possibility of determining the vehicle information recorded with use of the electric power supplied from the auxiliary power source section makes it unnecessary for the user to check all the vehicle information loaded into the PC one by one to search for the vehicle information recorded in the second memory with use of the electric power supplied from the auxiliary power source section. Accordingly, it is possible to simplify an operation to search for certain vehicle information recorded in the second memory.

In addition, in the invention, alternatively, the recording control section is designed in a manner that the vehicle information recorded in the first memory is recorded in the second memory so that it is possible to discriminate that the recording in the second memory is carried out with use of electric power supplied from the auxiliary power source section. The adoption of such a recording control section as has been described makes it possible to easily and promptly discriminate, by virtue of addition of identification information and so forth to a folder name, that the recording of vehicle information in the second memory is carried out with use of electric power supplied from the auxiliary power source section even in the absence of electric power supply from the main power source section.

In addition, in the invention, further alternatively, the recording control section is designed in a manner that, every time a predetermined condition is fulfilled, a new folder is created on the second memory by adding, to the folder name, identification information whereby it is possible to discriminate that certain vehicle information is recorded with use of electric power supplied from the auxiliary power source section, and part of the vehicle information recorded in the first memory is recorded in the new folder.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
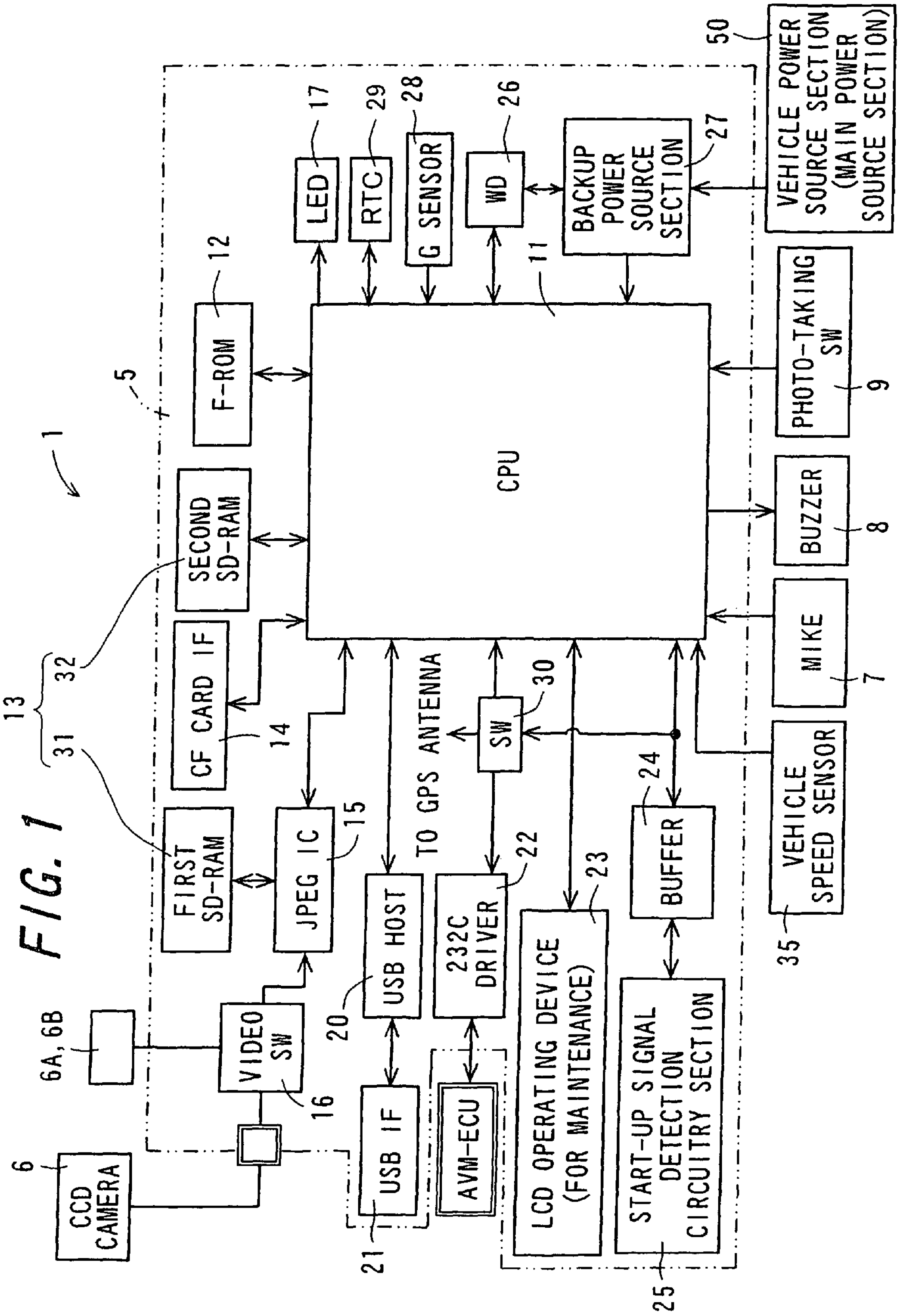
FIG. 1 is a block diagram showing an electrical configuration of a drive recorder according to one embodiment of the invention.

Now referring to the drawings, preferred embodiments of the invention are described below.

Hereinafter will be described a plurality of embodiments for implementing the invention. In the following descriptions, portions corresponding to those that have already been described according to the embodiment preceding will be identified with the same reference symbols, and overlapping descriptions may be omitted. In a case where descriptions are only given to a part of the structure of an embodiment, the other part thereof will be deemed to be the same as that of the preceding embodiment. Not only it is possible use portions specifically described in the respective embodiments in combination, but it is possible to combine the respective embodiments per se in part as long as no problem will be posed to the combination. Vehicle information recording apparatuses (hereinafter, occasionally referred to as a "drive recorder") which will be hereinafter described in accordance with the following embodiments can suitably be mounted in, for example, a passenger vehicle with a battery voltage of twelve volts.

Figure 2:
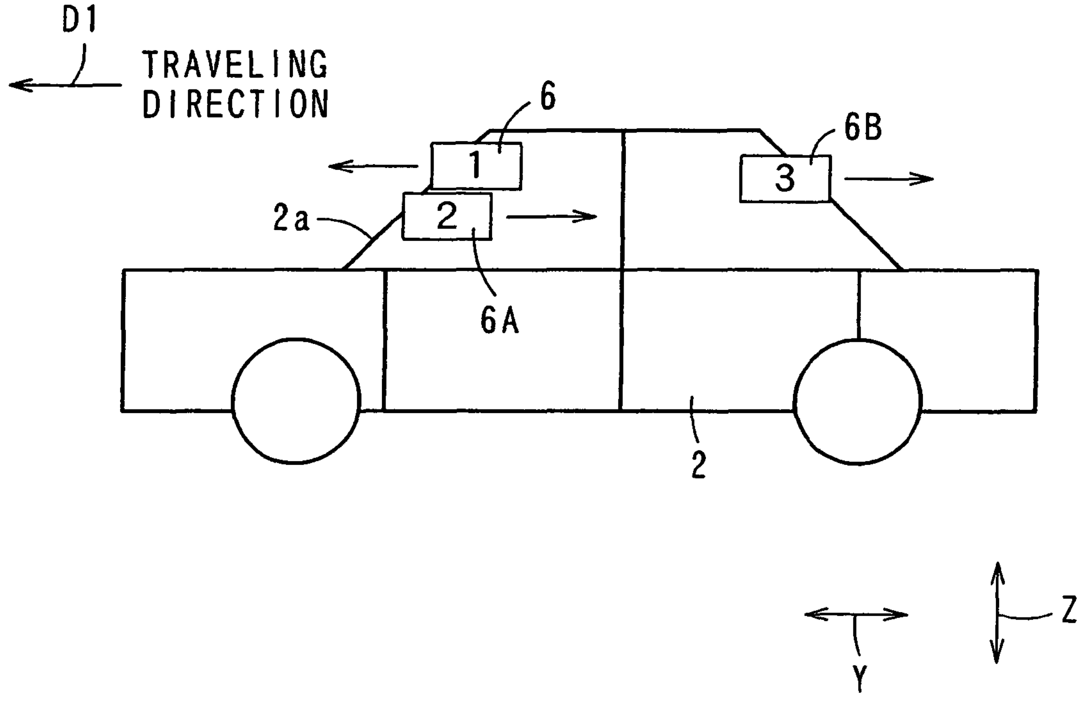
FIG. 2 is a view of assistance in explaining the installation position of a camera in a vehicle.

FIG. 1 is a block diagram showing an electrical configuration of a drive recorder 1 according to one embodiment of the invention. FIG. 2 is a view of assistance in explaining the installation position of a camera in a vehicle 2. The drive recorder 1 is so designed as to store therein image information which is provided from the camera installed in the vehicle 2 as an image taking device, and as well as to record, in a case where a predetermined condition is fulfilled, image information, audio information, and the like information on a recording medium, to be specific, a compact flash (registered trademark) card (hereinafter, occasionally referred to as a "CF card") 3 which is a nonvolatile memory. The CF card 3 is electrically connected to a flash memory and a controller circuit. Information stored in the flash memory is not lost even in the absence of electric power supply. The controller circuit is designed for controlling input and output operations between the CF card 3 and an external system.

The drive recorder 1 has a drive recorder main body 5, a camera 6 serving as an image taking device, a microphone (hereinafter, referred to as a "mike") 7 for acquiring audio information inside the vehicle, and a buzzer 8 for giving alarm information. The camera 6 and the mike 7 are disposed separately from the drive recorder main body 5, yet are electrically connected thereto. The buzzer 8 is disposed integrally with the drive recorder main body 5. The vehicle 2 is provided with at least one camera 6.

The camera 6 is achieved by a charge coupled device (CCD for short) camera. In order to take a picture of a scene ahead of the vehicle 2 as indicated by an arrow D1 in FIG. 2, the camera 6 is attached to, for example, a windshield 2*a* behind a rearview mirror through the use of a non-illustrated bracket. That is, the camera 6 is fixed as so to be oriented in a direction forwardly of the vehicle. Optionally, the vehicle 2 may be provided with a second camera 6, or second and third cameras 6. Specifically, it is possible to dispose a photo-taking camera 6A inside the vehicle, or dispose in addition a photo-taking camera 6B in a rearward position of the vehicle. In some cases, a photo-taking switch 9 for effecting an image pickup using the cameras 6 described above is disposed separately from the drive recorder main body 5 and is electrically connected thereto.

The drive recorder main body 5 has formed therein an insertion opening for allowing for insertion and withdrawal of the CF card 3. A recording medium which can be inserted in and extracted from the insertion opening is not limited to the above-described CF card 3, but may be a secure digital (SD) memory card, a memory stick, and a smart medium, for example.

The drive recorder main body 5 has a central processing unit (CPU) 11, a flash read only memory (F-ROM for short) 12, a random access memory (RAM for short) 13 serving as a storage portion, a CF card interface (CF card IF for short) 14, a JPEG IC (JPEG: Joint Photographic coding Experts Group, IC: Integrated Circuit) 15, a video switch (video SW for short) 16, and a light emitting diode (LED for short) 17.

The drive recorder main body 5 further has a USB HOST20 which is an element having a USB (Universal Serial Bus) host capability, a USB interface (USB IF for short) 21, a communication driver 22, a LCD (liquid crystal display) operating device connector 23, a buffer 24, a start-up signal detection circuitry section 25, a watch dog IC (WD for short) 26 having a watch dog function, a backup power source section 27, a G sensor 28, a real time clock (RTC for short) 29, and a non-illustrated counter for counting vehicle speed pulses. The start-up signal detection circuitry section 25 is designed for detecting vehicular signals including a power source start-up signal in Hi/Lo signal mode provided from the vehicle 2. The LCD operating device connector 23 is designed to receive connection of an LCD operating device 27 which allows for input of driver information.

The G sensor 28 is capable of detecting the acceleration of gravity exerted in an anteroposterior direction of the vehicle 2 as well as in a lateral direction of the vehicle 2, namely a G sensor output value. The anteroposterior direction includes front and rear directions in which the vehicle 2 travels. In addition, the lateral direction refers to directions of from right to left and from left to right when viewed toward the front direction of the vehicle 2. A direction which is orthogonal to the anteroposterior direction and the lateral direction is regarded as a vertical direction. The anteroposterior direction is defined as a Y axis direction and the lateral direction is defined as an X axis direction. A G sensor output value corresponding to the X axis direction and a G sensor output value corresponding to the Y axis direction are detected and recorded individually.

In the F-ROM 12 is stored a control program for generally controlling hardware sources constituting the drive recorder main body 5. The RAM 13 is composed of a first SD-RAM (Synchronous Dynamic Random Access Memory) 31 and a second SD-RAM 32. In the first SD-RAM 31 are temporarily stored image data which have been converted into JPEG-format data by the JPEG IC 15. The second SD-RAM 32 is constructed by a ring buffer memory. In the second SD-RAM 32 are temporarily stored vehicle information concerning the vehicle 2, the JPEG format-converted still image information, and audio information inputted from the mike 7, and so forth in a cyclic manner. The vehicle information concerning the vehicle 2 includes the G sensor output value detected by the G sensor 28, information on driving speed (hereinafter, referred to as "vehicle speed") of the vehicle detected a subsequently-described vehicle speed sensor 35, the vehicular signals detected by the start-up signal detection circuitry section 25. The RTC 29 provides system clock and clock information including current time to the CPU 11. The CPU 11, the F-ROM 12, and the second SD-RAM 32 are operated on the basis of the system clock.

The F-ROM 12, the second SD-RAM 32, the CF card IF 14, the LED 17, and the RTC 29 are each electrically connected to the CPU 11. The first SD-RAM 31 and the video SW 16 are electrically connected to the CPU 11 via the JPEG IC 15. In a case where a plurality of cameras 6 are disposed, the video SW 16 is provided as a selector switch to allow selection among the plurality of cameras 6 for taking images at a predetermined time interval.

The USB IF 21 is electrically connected to the CPU 11 via the USB HOST 20. Moreover, the communication driver (232C driver) 22, the LCD operating device connector 23, the buffer 24, the WD 26, the G sensor 28, and the backup power source section 27 are each electrically connected to the CPU 11. The buffer 24 is electrically connected to the start-up signal detection circuitry section 25. The backup power source section 27 is electrically connected to the WD 26. In a case where the power-up signal is unavailable, a switch 30 is operated to switch an input-via-communication driver 22 mode to an input-via-GPS antenna mode. In this case, the position of the vehicle 2 can be detected by using GPS alone. The backup power source section 27 supplies electric power to the CPU 11 when the supply of electric power from a vehicle power source section 50 disposed in the vehicle is interrupted.

In this embodiment, the second SD-RAM 32 corresponds to a first memory, and the CF card 3 corresponds to a second memory. Moreover, the CPU 11 corresponds to a recording control section. The vehicle power source section 50 corresponds to a main power source section, and the backup power source section 27 corresponds to an auxiliary power source section.

Figure 3:
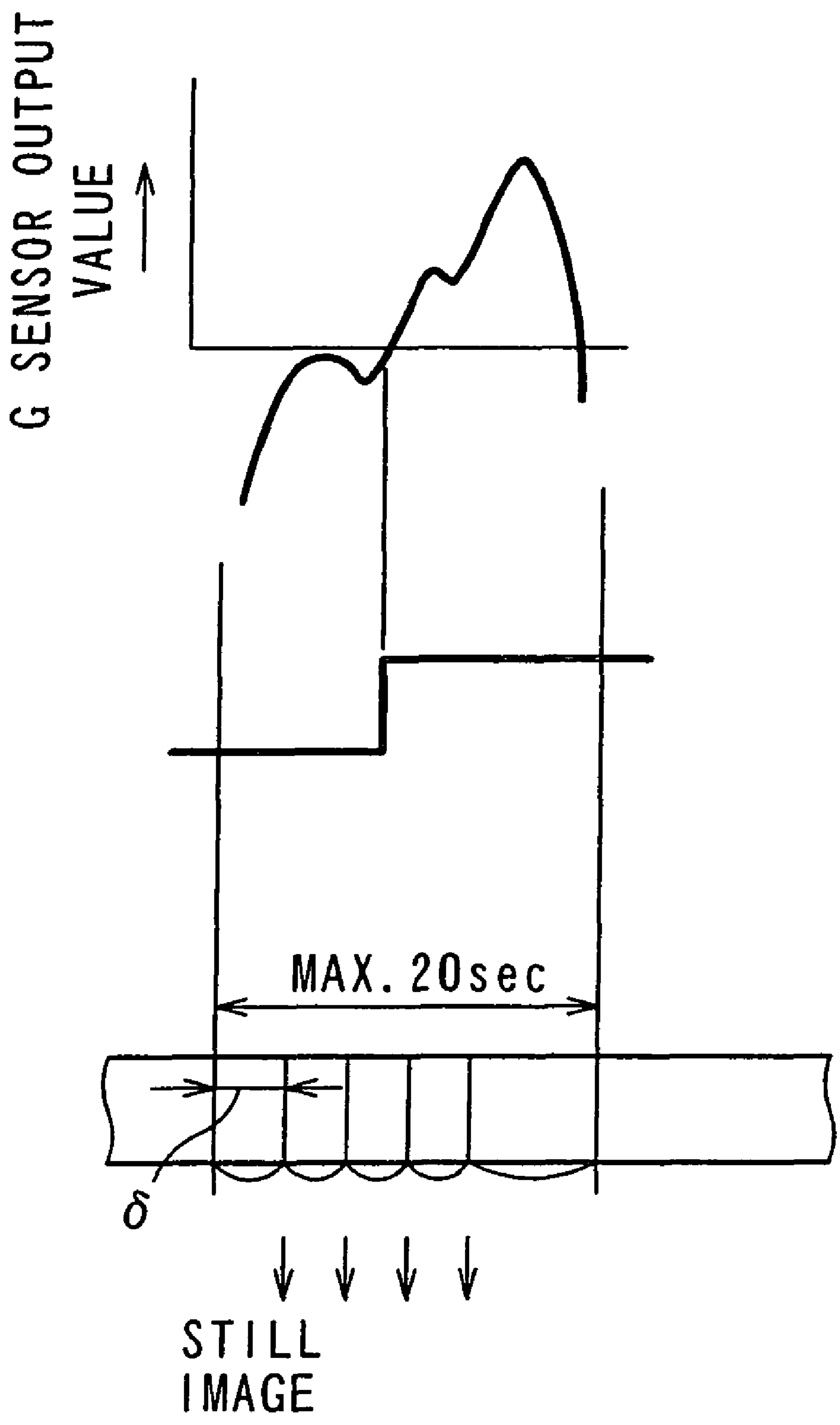
FIG. 3 is a view showing how still image information is recorded on a CF card at given time intervals δ on the basis of G sensor output values.
Figure 4:
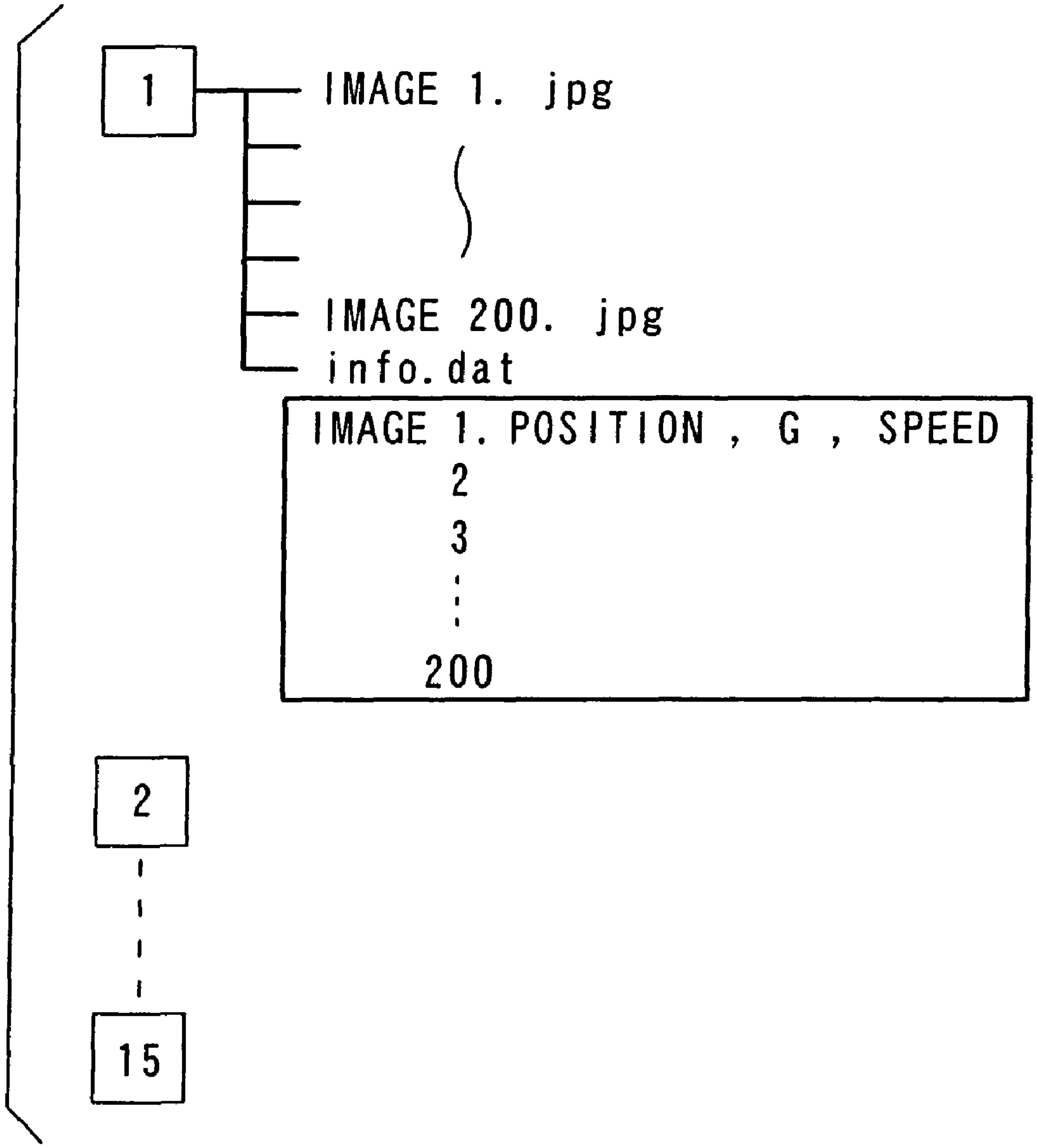
FIG. 4 is a view showing the relationship between part of the still image information and information on position and so forth.

FIG. 3 is a view showing how still image information is recorded on the CF card 3 at given time intervals δ on the basis of the G sensor output values. FIG. 4 is a view showing the relationship between part of the still image information and information on position and so forth. Under the control of the CPU 11, input images which have been taken by the camera 6 and inputted to the drive recorder main body 5, are converted into JPEG-format still image information by the JPEG IC 15, and the JPEG format-converted still image information is temporarily stored in the first SD-RAM 31. After that, under the control of the CPU 11, the JPEG format-converted still image information is stored frame by frame in the second SD-RAM 32 successively in chronological order. At this time, a single piece (1 frame) of still image is stored in the second SD-RAM 32, for example, in "image*.jpg" format (refer to FIG. 4). The symbol "*" represents a value of integer.

Under the control of the CPU 11, as additional information concerning the still images, G sensor output values, positional information, time information, vehicle speed information provided from the vehicle speed sensor 35 (refer to FIG. 1), and audio information from the mike 7 as to the vehicle 2 are stored in the second SD-RAM 32 one after another.

In a case where a predetermined recording condition is fulfilled, the CPU 11 effects control of the buzzer 8 in such a manner that a signal indicative of the starting of recording is given to the buzzer 8. Thereupon, under the control of the CPU 11, the JPEG format-converted image, the G sensor output values, the positional information, the time information, and the vehicle speed information each stored in the second SD-RAM 32 are recorded on the CF card 3. The present embodiment is so designed that, for example, 10 pieces (10 frames) of still images are recorded on the CF card 3 in one second and 200 pieces (200 frames) of still images can be recorded on the CF card 3 in the period of twenty seconds at the maximum per 1 event. The "1 event" is equivalent to one circumstance where the predetermined recording condition is fulfilled.

More specifically, in a case where time for recording the still image is set to be twenty seconds per 1 event (1 record), 15 records of still images can be recorded on the CF card 3 according to the embodiment. For example, as shown in FIG. 4, a still image information group composed of 200 pieces of still images "image 1.jpg", . . . "image 200.jpg" is recorded on the CF card 3 in the period of twenty seconds at the maximum. Moreover, the file name of each of the still images "image1.jpg", . . . "image200.jpg" included in the image information group is correlated with the positional information, the time information, the G sensor output values, and the vehicle speed information concerning the vehicle 2 thereby to obtain additional information concerning the image information group. The additional information is also recorded on the CF card 3.

Figure 5:
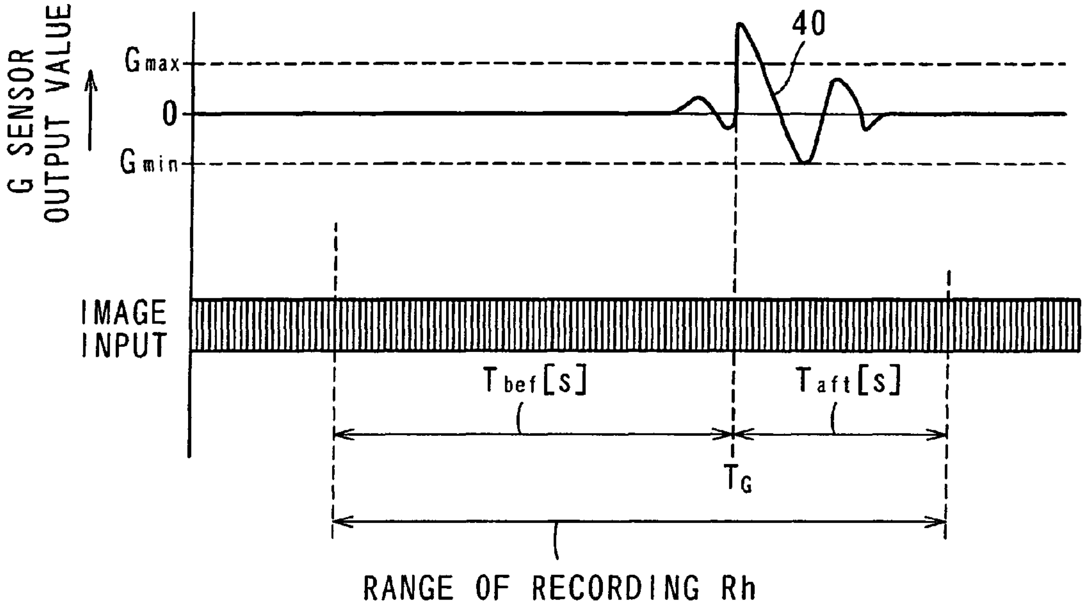
FIG. 5 is a view showing the relationship between the G sensor output values in excess of a threshold, and a recording range Rh which is the range of recording still image information on the CF card.

FIG. 5 is a view showing the relationship between the G sensor output values 40 in excess of a threshold, and a recording range Rh which is the range of recording still image information on the CF card 3. As a recording condition, upon the G sensor output value 40 exceeding the threshold Gmax or Gmin, over the recording range of the period of twenty seconds at the maximum with reference to a time point at which the threshold has been exceeded, the JPEG format-converted images, their respective G sensor output values, positional information, time information, and vehicle speed information, and audio information provided through the mike 7 recorded in the second SD-RAM 32 in an endless manner are recorded on the CF card 3. In the following descriptions, the time point at which the threshold has been exceeded is occasionally referred to as "the time point of occurrence of trigger" $T_G$. A value calculated by adding a recording duration of $T_{aft}$ seconds as observed after the occurrence of trigger to a recording duration of $T_{bef}$ seconds as observed before the occurrence of trigger is equal to the total sum of the recording time (recording range Rh) in one event.

In the embodiment, the before-trigger recording duration $T_{bef}$ is set to be twelve seconds, and the after-trigger recording duration $T_{aft}$ is set to be eight seconds. The before-trigger recording duration $T_{bef}$ can be selected in a range of from eight seconds to twelve seconds, and the after-trigger recording duration $T_{aft}$ can be selected in a range of from eight seconds to twelve seconds. In other words, the recording duration $T_{bef}$ can be selected in a range of from eight seconds to twelve seconds, and the recording duration $T_{aft}$ can be selected in a range of from eight seconds to twelve seconds, thus resulting in that the recording range Rh in one event can be set to be twenty seconds at the maximum.

In the embodiment, although the total sum of the recording time (recording range Rh) in one event is set to be twenty seconds at the maximum, the total sum of the recording range Rh in one event may be set to be longer than twenty seconds or shorter than twenty seconds.

Figure 6:
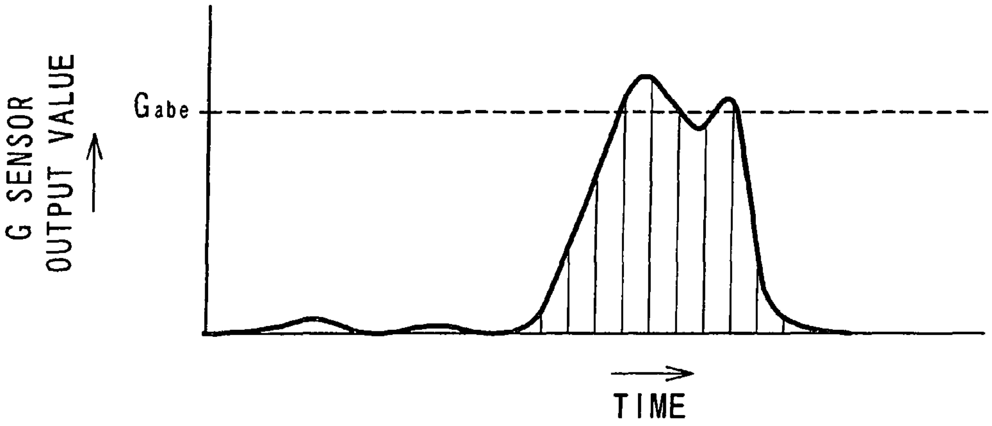
FIG. 6 is a view of assistance in explaining a method of determining a threshold for the G sensor output value.

FIG. 6 is a view of assistance in explaining a method of determining a threshold for the G sensor output value. The CPU 11 acquires an output produced by the G sensor 28 and discriminates whether or not the acquired value exceeds a threshold $G_{abe}$. As has been already described, the G sensor 28 is a biaxial sensor for detecting acceleration of gravity exerted in the X axis direction and the Y axis direction. The G sensor 28 is so designed as to be able to detect acceleration of gravity of the vehicle 2 exerted in the anteroposterior direction and in the lateral direction. Accordingly, it is possible to detect without fail not only a collision accident occurring in the anteroposterior direction but also a collision accident occurring in the lateral direction, and thus the causes of the accident can be analyzed. The determination of threshold is made on the basis of a vector sum of the acceleration of gravity in the anteroposterior direction and that in the lateral direction. The threshold can be changed to any given value through a setting operation.

Figure 7:
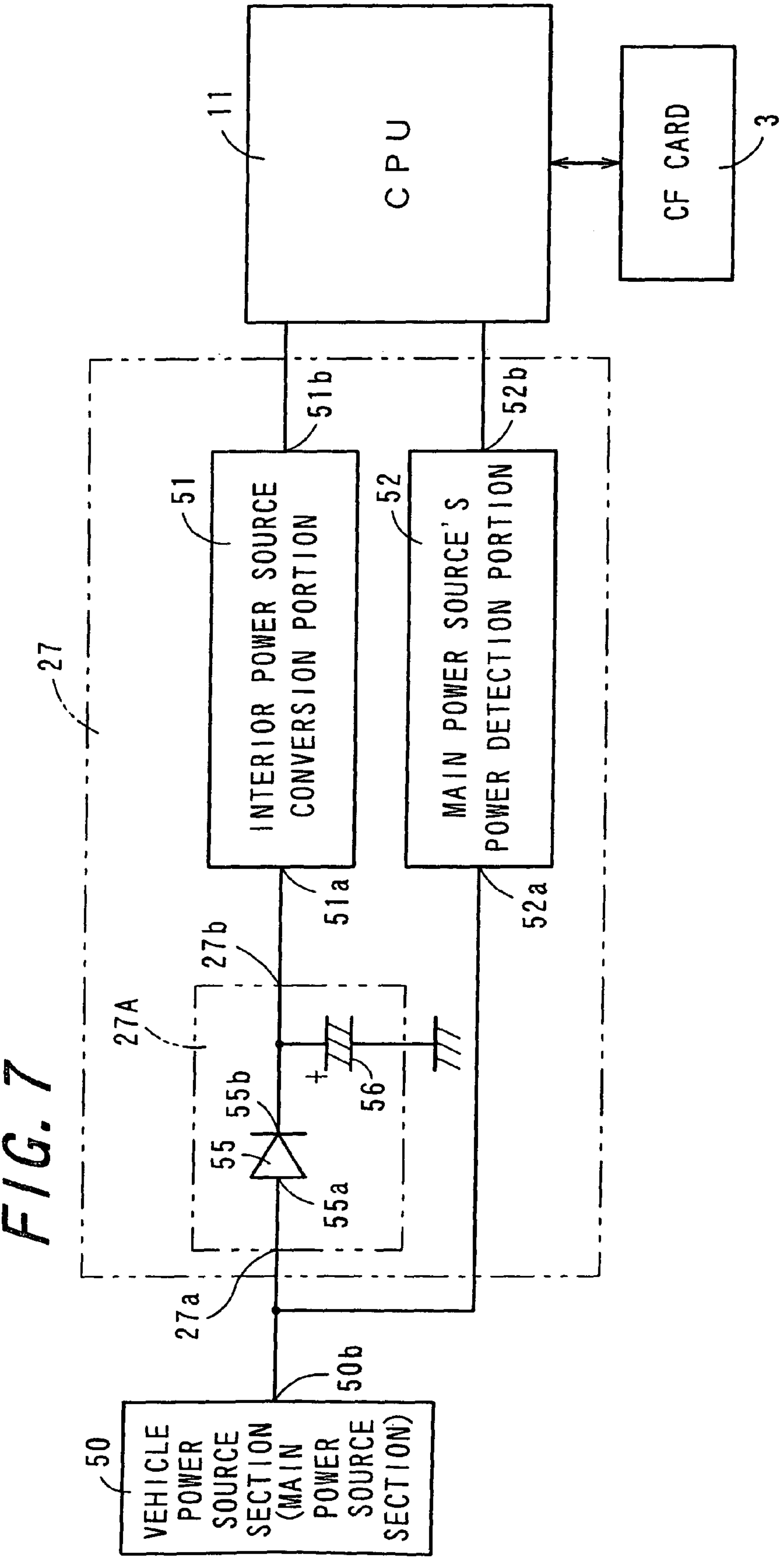
FIG. 7 is a block diagram showing part of the configuration of the drive recorder according to one embodiment of the invention.

FIG. 7 is a block diagram showing part of the configuration of the drive recorder 1 according to one embodiment of the invention. The backup power source section 27 of the drive recorder 1 according to the present embodiment is so configured as to include a backup circuitry portion 27A, an interior power source conversion portion 51, and a main power source's power detection portion 52 serving as a power detection portion.

The vehicle power source section (hereinafter, occasionally referred to as a "main power source section") 50 disposed in the vehicle 2 has its output portion 50*b* is electrically connected to an input part 27*a* of the backup circuitry portion 27A and also to an input part 52*a* of the main power source's power detection portion 52. An output part 27*b* of the backup circuitry portion 27A is electrically connected to an input part 51*a* of the interior power source conversion portion 51. An output part 51*b* of the interior power source conversion portion 51 and an output part 52*b* of the main power source's power detection portion 52 are electrically connected to the CPU 11.

In the present embodiment, the backup circuitry portion 27A is composed of a diode 55 and a capacitor 56. More specifically, the output portion 50*b* of the vehicle power source section 50 is electrically connected to an anode 55*a* of the diode 55. The capacitor 56 is connected between a cathode 55*b* of the diode 55 and the interior power source conversion portion 51, and the other end of the capacitor 56 is connected to ground. A point of connection between the cathode 55*b* of the diode 55 and a positive terminal of the capacitor 56 is electrically connected to the input part 51*a* of the interior power source conversion portion 51. The capacitor 56 may be achieved by an electrolytic capacitor or an electric double layer capacitor.

In the backup circuitry portion 27A, in the presence of electric power supply from the vehicle power source section 50, the capacitor 56 is charged by the supplied power. On the other hand, in the absence of electric power supply from the vehicle power source section 50, the electric charge charged in the capacitor 50 is discharged whereby to supply electric power to the interior power source conversion portion 51.

In the interior power source conversion portion 51, a voltage supplied from the backup circuitry portion 27A is converted into a voltage for use in the CPU 11, and the voltage thus converted is fed to the CPU 11. The interior power source conversion portion 51 is achieved by a regulator, for instance.

The main power source's power detection portion 52 detects whether or not electric power is being supplied from the vehicle power source section 50. And the result of the detection is provided to the CPU 11. More specifically, the presence or absence of electric power supply from the vehicle power source section 50 is detected on the basis of a judgement as to whether or not a value of voltage or current supplied from the vehicle power source section 50 is zero. More specifically, when the value of voltage or current supplied from the vehicle power source section 50 is zero, the main power source's power detection portion 52 detects the absence of electric power supply from the vehicle power source section 50.

Figure 8:
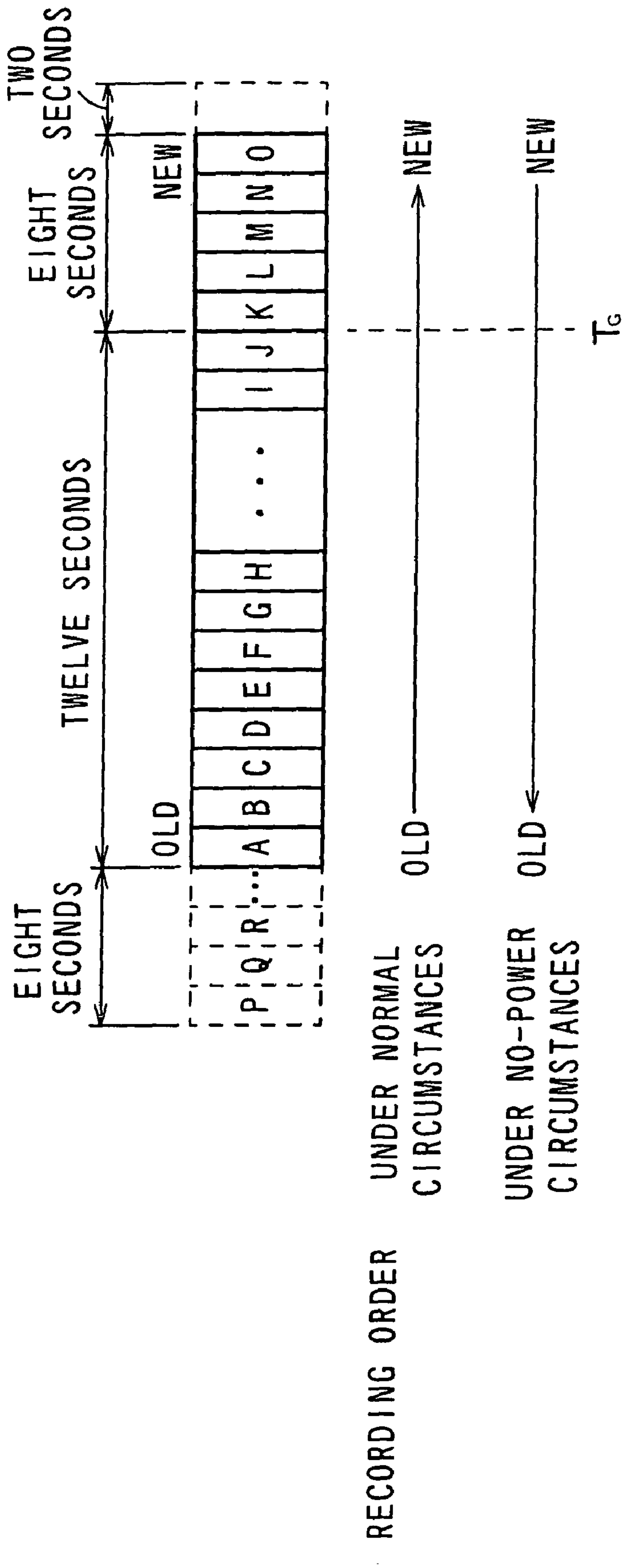
FIG. 8 is a view in assistance of explaining a second recording operation for a case where the still image information stored in a second SD-RAM is recorded on the CF card successively in reverse chronological order.
Figure 9:
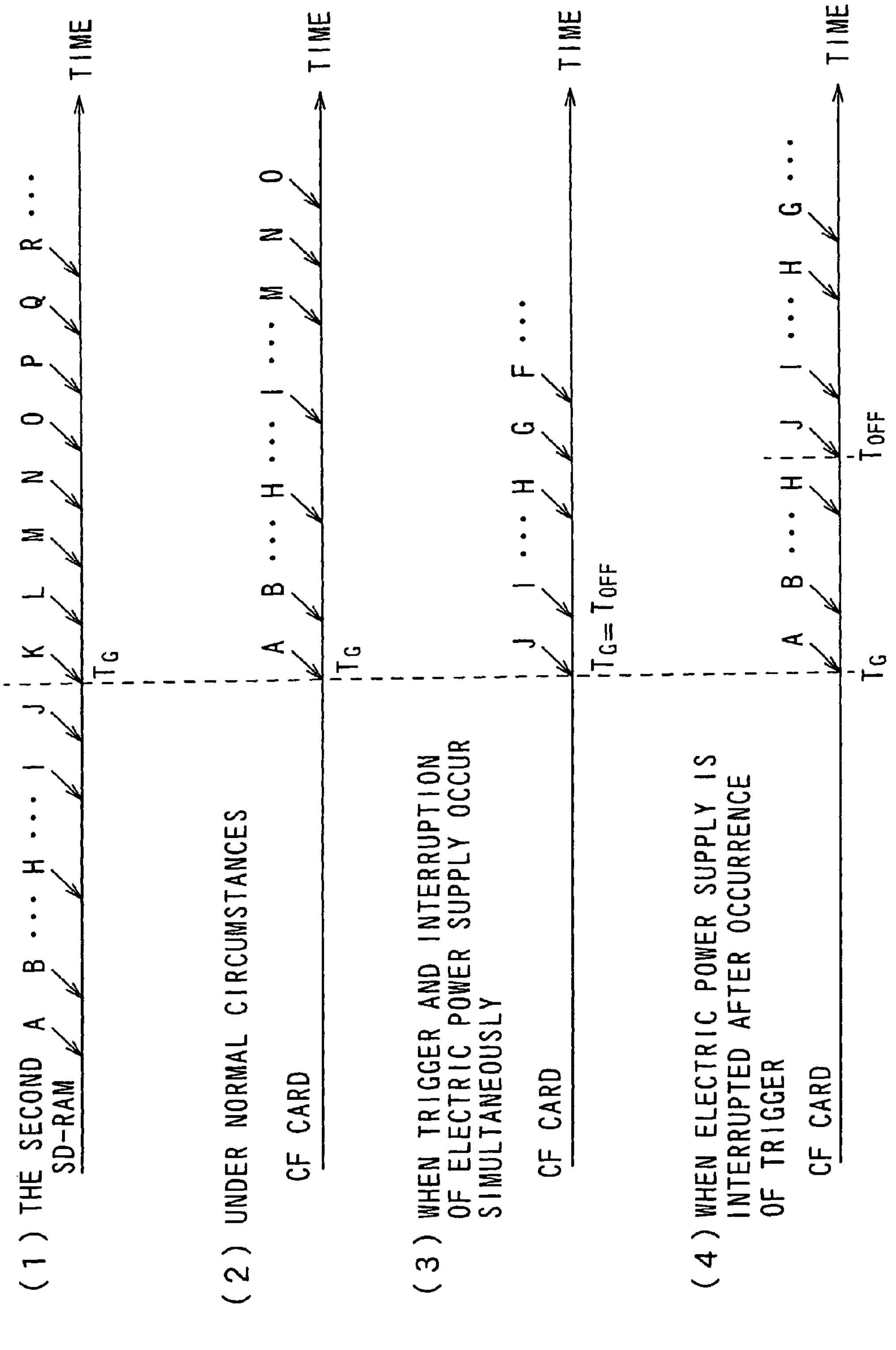
FIG. 9 is a view showing a storing operation for storing the still image information to the second SD-RAM and recording operations for recording the still image information on the CF card.

FIG. 8 is a view in assistance of explaining a second recording operation for a case where the still image information stored in the second SD-RAM 32 is recorded on the CF card 3 successively in reverse chronological order. FIG. 9 is a view showing a storing operation for storing the still image information to the second SD-RAM 32 and recording operations for recording the still image information on the CF card 3. FIG. 9(1) is a view showing a storing operation for storing still image information in the second SD-RAM 32. FIG. 9(2) is a view showing a recording operation for recording the still image information on the CF card 3 in the presence of electric power supply from the vehicle power source section 50. FIG. 9(3) is a view showing a recording operation for recording still image information on the CF card 3 when trigger has occurred and simultaneously the electric power supply from the vehicle power source section 50 has been interrupted. FIG. 9(4) is a view showing a recording operation for recording still image information on the CF card 3 when the electric power supply from the vehicle power source section 50 has been interrupted after the occurrence of trigger.

The second SD-RAM 32 according to the present embodiment has a capacity capable of storing thirty-second-long still image information. As shown in FIG. 8 and FIG. 9(1), still image information of each frame is stored successively in the order of frame A, frame B, frame C, . . . frame M, frame N, and frame O, for example. In addition, the present embodiment is so designed that, when the G sensor output value has exceeded the threshold Gmax or Gmin, twelve-second-long still image information stored before the time point of occurrence of trigger $T_G$, and eight-second-long still image information stored after the time point of occurrence of trigger $T_G$ are recorded from the second SD-RAM 32 on the CF card 3, with reference to the time point at which the threshold has been exceeded (the time point of occurrence of trigger) $T_G$.

Under circumstances where an instruction to record on the CF card 3 still image information that has been taken by the camera 6 and stored in the second SD-RAM 32, to be specific, a signal indicative of the instruction is provided, and where a main power source's power detection portion 52 detects the presence of electric power supply from the vehicle power source section 50 (hereinafter, occasionally referred to as "normal circumstances"), the CPU 11 performs a first recording operation in a manner that still image information stored in the second SD-RAM 32 within a predetermined period of time including the time at which the signal was given is recorded, with reference to the time point of occurrence of trigger $T_G$, on the CF card 3 successively in the order in which the frames were stored in the second SD-RAM 32.

More specifically, as shown in FIG. 8, under normal circumstances, out of the still image information stored in the second SD-RAM 32, the twelve-second-long still image information before the time point of occurrence of trigger $T_G$ and the eight-second-long still image information after the time point of occurrence of trigger $T_G$ each stored with reference to the time point of occurrence of trigger $T_G$, are recorded under the control of the CPU 11 on the CF card 3 successively in the order in which the frames were stored in the second SD-RAM 32. Further more specifically, under normal circumstances, as shown in FIG. 9(2), certain still image information stored in the second SD-RAM 32 is recorded under the control of the CPU 11 on the CF card 3 successively in the order of frame A, frame B, . . . frame H, . . . frame I, . . . frame M, frame N, and frame O.

In addition, under normal circumstances, even during the recording of the still image information on the CF card 3, still image information of new frames is stored, as shown in FIG. 8 and FIG. 9(1), on the free region of the second SD-RAM 32 successively in the order of frame P, frame Q, frame R, . . . . Upon the still image information stored in the second SD-RAM 32 being recorded on the CF card 3, the still image information is erased from the second SD-RAM 32 and new still image information can be stored on a free space resulted from the erasure.

Under circumstances where the predetermined condition is fulfilled such as the G sensor output value representing the acceleration of gravity exerted in the anteroposterior direction and the lateral direction of the vehicle 2 exceeds the predetermined threshold and thus the signal indicative of the instruction to record still image information stored in the second SD-RAM 32 on the CF card 3 is given, and where the main power source's power detection portion 52 detects the absence of electric power supply from the vehicle power source section 50 (hereinafter, occasionally referred to as "no-power circumstances"), out of the still image information stored in the second SD-RAM 32, with the time point of occurrence of trigger $T_G$ as the reference, still image information of frames which have been stored in the second SD-RAM 32 later in chronological order is more important than still image information of frames which have been stored in the second SD-RAM 32 earlier in chronological order, in analyzing the state of the accident and the driving conditions of the vehicle.

Accordingly, in the present embodiment, under no-power circumstances, a second recording operation as will be hereinafter described is performed under the control of the CPU 11. That is, under no-power circumstances, the CPU 11 performs the second recording operation, which is different from the first recording operation, in a manner that at least part of the still image information stored in the second SD-RAM 32, to be specific, with the time point of occurrence of trigger $T_G$ as the reference, certain still image information of frames recently having been stored including the frame which has been stored in the second SD-RAM 32 at the time point of occurrence of trigger $T_G$, can be recorded on the CF card 3 successively in reverse chronological order from the time point of occurrence of trigger $T_G$, with use of the electric power supply from the backup power source section 27.

Further specifically, under no-power circumstances, out of the still image information stored in the second SD-RAM 32, certain still image information of frames recently having been stored including the frame which has been stored in the second SD-RAM 32 at the time point of occurrence of trigger $T_G$, is recorded on the CF card 3 successively in reverse chronological order. Further specifically, under no-power circumstances, the CPU 11 effects control in a manner that certain still image information of frames is recorded on the CF card 3 successively in the order of frame J, frame I, . . . frame H, frame G, frame F, . . . , with the time point of occurrence of trigger $T_G$ as the reference.

Note that time duration for which still image information is recorded on the CF card 3 under no-power circumstances according to the second recording operation is, the same as in the first recording operation, a period of time from twelve seconds before the time point of occurrence of trigger $T_G$ to the time point of occurrence of trigger $T_G$. However, the time duration may be set to be a period of time from a predetermined time (time shorter than twelve seconds, e.g. five seconds and ten seconds) before the time point of occurrence of trigger $T_G$ to the time point of occurrence of trigger $T_G$. By doing so, it is possible to downsize the backup power source section 27.

When the trigger and the interruption of electric power supply from the vehicle power source section 50 has occurred simultaneously, in other words, when the time point of occurrence of trigger $T_G$ corresponds to the time point of start of the no-power circumstances $T_{OFF}$, as shown in FIG. 9(3), the CPU 11 effects control in a manner that still image information of frames that were stored at and before the time point of occurrence of trigger $T_G$, is recorded on the CF card 3 successively in the order of frame J, frame I, . . . frame H, frame G, and frame F . . . .

When the electric power supply from the vehicle power source section 50 is interrupted after the occurrence of trigger, as shown in FIG. 9(4), the CPU 11 performs two recording operations different from each other, which are performed between the time point of occurrence of trigger $T_G$ and the time point of start of the no-power circumstances $T_{OFF}$, and after the time point of start of the no-power circumstances $T_{OFF}$, respectively. More specifically, in the presence of electric power supply from the vehicle power source section 50, the CPU 11 performs the recording operation shown in FIG. 9(2), to be specific, still image information of frames stored in the second SD-RAM 32 is recorded on the CF card 3 successively in the order of frame A, frame B, . . . frame H, . . . .

Under no-power circumstances, the CPU 11 performs the recording operation shown in FIG. 9(3). Specifically, with reference to the time point of occurrence of trigger $T_G$, on the CF card 3 is recorded certain still image information of frames recently having been stored including the frame that has been stored in the second SD-RAM 32 at the time point of occurrence of trigger $T_G$, successively in reserve chronological order from the time point of occurrence of trigger $T_G$, to be specific, in the order of frame J, frame I, . . . frame H, frame G, frame F, . . . .

Figure 10:
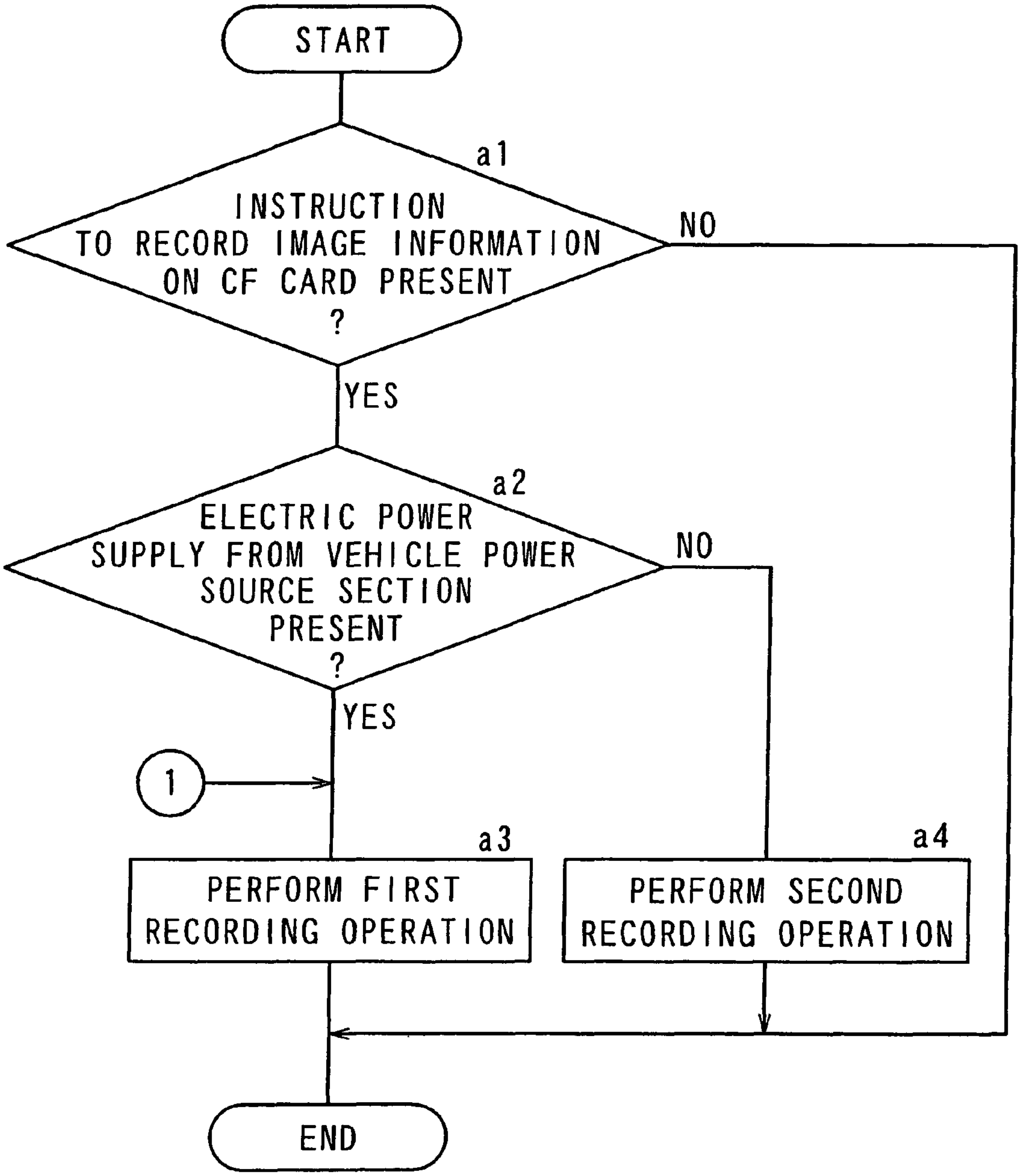
FIG. 10 is a flowchart showing an operation procedure followed by the CPU with regard to the second recording operation for recording the still image information stored in the second SD-RAM on the CF card successively in reverse chronological order.

FIG. 10 is a flowchart showing an operation procedure followed by the CPU 11 with regard to the second recording operation for recording the still image information stored in the second SD-RAM 32 on the CF card 3 successively in reverse chronological order. In the flowchart shown in FIG. 10, the operation is started under the condition that the drive recorder main body 5 is powered up. The operation is performed under the control of the CPU 11. Upon the start-up of the operation, the operation procedure goes to Step a1.

In Step a1, it is determined whether or not the CPU 11 has been given a recording instruction to record the still image information stored in the second SD-RAM 32 on the CF card 3. When the recording instruction has been given, the operation procedure goes to Step a2. On the other hand, when the recording instruction has not been given, the operation procedure comes to an end.

The recording instruction to record the still image information stored in the second SD-RAM 32 on the CF card 3 is given to the CPU 11 when the G sensor output value has exceeded the threshold Gmax or Gmin, for example. Accordingly, the CPU 11 determines whether or not the recording instruction to record the still image information stored in the second SD-RAM 32 on the CF card 3 is given, on the basis of a judgment as to whether or not the G sensor output value has exceeded the threshold Gmax or Gmin, for example.

In addition, in Step a1, the CPU 11 may determine whether or not the recording instruction to record the still image information stored in the second SD-RAM 32 on the CF card 3 is given, on the basis of a judgment as to whether or not the photo-taking switch 9 has been operated by the user.

In Step a2, it is determined whether or not electric power is being supplied from the vehicle power source section 50. When the electric power is being supplied from the vehicle power source section 50, the operation procedure goes to Step a3. On the other hand, when no electric power is being supplied from the vehicle power source section 50, the operation procedure goes to Step a4. In Step a3, the above-described first recording operation is performed. Following the completion of the first recording operation, the operation procedure comes to an end. In Step a4, the above-described second recording operation is performed. Following the completion of the second recording operation, the operation procedure comes to an end.

As has been described above, according to the present embodiment, when the signal indicative of the instruction to record the still image information taken by the camera 6 is given and when the main power source's power detection portion 52 detects the absence of electric power supply from the vehicle power source section 50, the CPU 11 performs the second recording operation, which is different from the first recording operation mentioned above, in a manner that at least part of the still image information stored in the second SD-RAM 32 frame by frame can be recorded on the CF card 3, with use of the electric power supplied from the backup power source section 27.

To be specific, under no-power circumstances, the CPU 11 performs the second recording operation in a manner that, out of the still image information stored in the second SD-RAM 32, certain still image information of frames recently having been stored including the frame which has been stored in the second SD-RAM 32 at the time point of occurrence of trigger $T_G$ can be recorded on the CF card 3 successively in reverse chronological order from the time point of occurrence of trigger $T_G$.

By doing so, for example, even in a case where the vehicle is involved in an accident and the impact caused by the accident has triggered the interruption of electric power supply from the vehicle power source section 50, out of the still image information stored in the second SD-RAM 32, on the CF card 3 can be recorded without fail still image information of frames that include the frame stored in the second SD-RAM 32 at the time point of occurrence of trigger $T_G$ and that have been stored later in chronological order, as well as still image information of frames that have been stored close in time to the time point of occurrence of trigger $T_G$, with use of the electric power supply from the backup power source section 27.

Accordingly, it is possible to specifically analyze, for example, the state of the accident and the driving conditions of the vehicle, on the basis of images representing the still image information recorded on the CF card 3, more specifically, images representing still image information of frames that are important in analyzing the state of the accident and the driving conditions of the vehicle.

Figure 11:
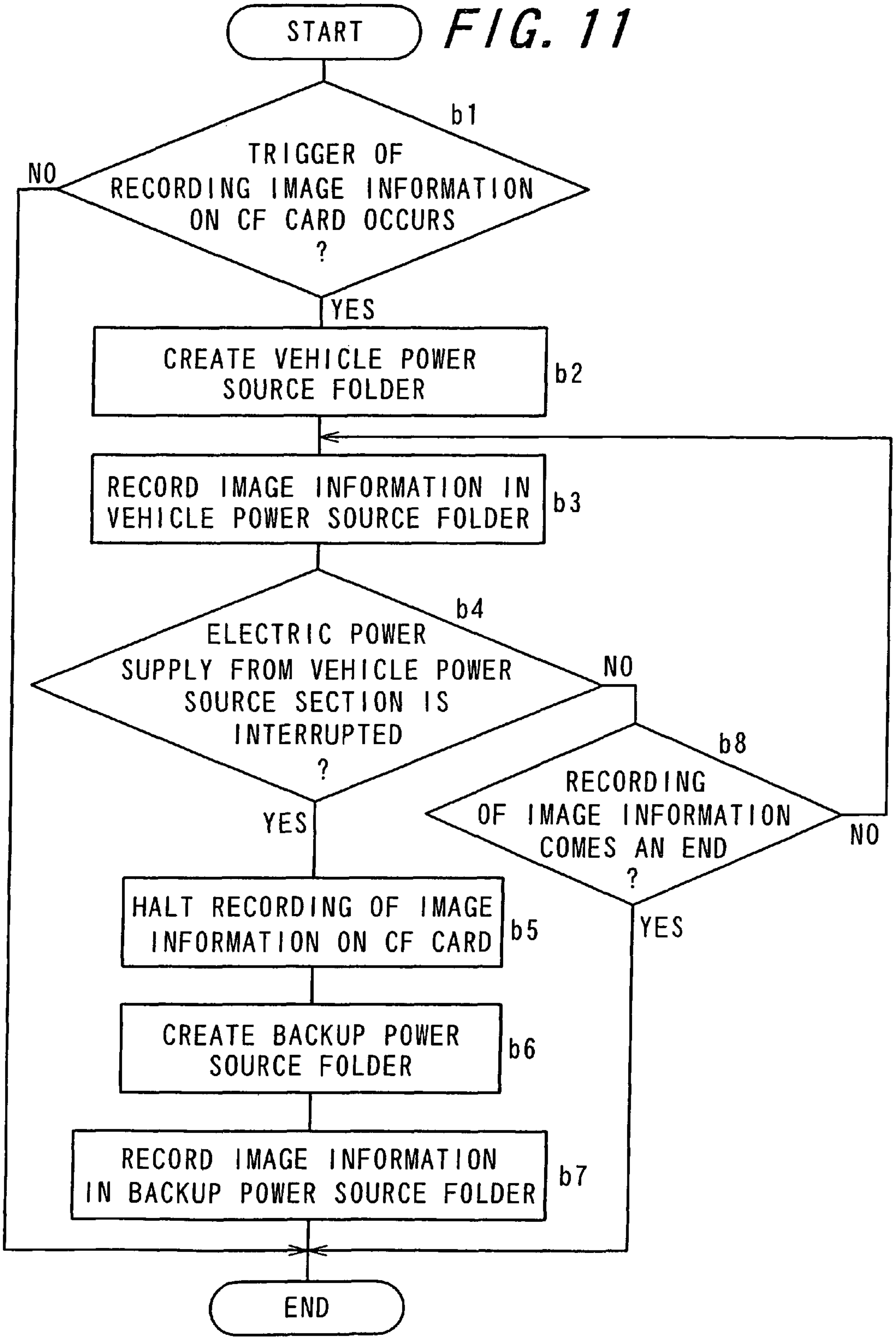
FIG. 11 is a flowchart showing an operation procedure followed by the CPU with regard to a recording operation to record still image information under no-power circumstances.

FIG. 11 is a flowchart showing an operation procedure followed by CPU 11 with regard to a recording operation to record still image information under no-power circumstances. In the flowchart shown in FIG. 11, the operation is started on condition that the drive recorder main body 5 is powered up. The operation is performed under the control of the CPU 11. Upon the start-up of the operation, the operation procedure goes to Step b1.

In Step b1, it is determined whether or not a trigger of recording the still image information stored in the second SD-RAM 32 on the CF card 3 has occurred or not. When the trigger has occurred, the operation procedure goes to Step b2. On the other hand, when the trigger has not occurred, the operation procedure comes to an end.

The CPU 11 determines whether or not the trigger of recording the still image information stored in the second SD-RAM 32 on the CF card 3 has occurred, on the basis of a judgment as to whether or not the G sensor output value has exceeded the threshold Gmax or Gmin, or on the basis of a judgment as to whether or not the photo-taking switch 9 has been operated, and so forth. More specifically, when it is recognized the G sensor output value has exceeded the threshold Gmax or Gmin, or when it is recognized that the photo-taking switch 9 has been operated, the CPU 11 confirms the occurrence of the trigger mentioned above.

In Step b2, on the CF card 3 is created a folder for recording the still image information stored in the second SD-RAM 32 (hereinafter, occasionally referred to as a "vehicle power source folder"), with use of electric power supplied from the vehicle power source section 50. And then, the operation procedure goes to Step b3.

A folder name of the vehicle power source folder is determined according to a predetermined regulation. In the present embodiment, the folder name of the vehicle power source folder is determined on the basis of the time and date when the trigger occurred (hereinafter, occasionally referred to as "date and time of occurrence of trigger"). When the CPU 11 recognizes that the G sensor output value has exceeded the threshold Gmax or Gmin and determines the trigger mentioned above has occurred, a character "G" is appended to the head of the folder name of the vehicle power source folder. When the CPU 11 recognizes that the photo-taking switch 9 has been operated and determines that the trigger mentioned above has occurred, a character "S" is appended to the head of the folder name of the vehicle power source folder.

In Step b2, for example, when the CPU 11 recognizes that the G sensor output value has exceeded the threshold Gmax or Gmin and determines that the trigger has occurred at 3:32:15 p.m., Sep. 5, 2006, a vehicle power source folder named "G060905153215" is created on the CF card 3.

In Step b3, the still image information stored in the second SD-RAM 32 is recorded in the vehicle power source folder created in Step b2. More specifically, a first recording operation is performed which is the same as the first recording operation performed in Step a3 of the flowchart shown in FIG. 10. Following the completion of Step b3, the operation procedure goes to Step b4.

In Step b4, it is determined whether or not electric power supply from the vehicle power source section 50 has been interrupted. When electric power supply from the vehicle power source section 50 has been interrupted, the operation procedure goes to Step b5. On the other hand, when electric power supply from the vehicle power source section 50 has not been interrupted, the operation procedure goes to Step b8. The CPU 11 determines whether or not electric power supply from the vehicle power source section 50 has been interrupted, on the basis of a result of detection provided from the main power source' power detection portion 52 of the backup power source section 27.

In Step b5, the process of recording the still image information stored in the second SD-RAM 32 in the vehicle power source folder of the CF card 3 is halted. And then, the operation procedure goes to Step b6.

In Step b6, on the CF card 3 is created a new folder by the addition of predetermined identification information to the folder name of the vehicle power source folder created in Step b2. More specifically, with use of the electric power supplied from the backup power source section 27, on the CF card 3 is created a folder for recording the still image information stored in the second SD-RAM 32 (hereinafter, occasionally referred to as a "backup power source folder"). After that, the operation procedure goes to Step b7.

A symbol "–A" serving as the predetermined identification information is added to the tail end of the folder name of the vehicle power source folder which is determined on the basis of the date and time when the trigger occurs, whereby a folder name of the backup power source folder according to the present embodiment is created. When the CPU 11 recognizes that the G sensor output value has exceeded the threshold Gmax or Gmin and confirms the occurrence of the trigger mentioned above, a character "G" is appended to the head of the folder name of the backup power source folder. When the CPU 11 recognizes that the photo-taking switch 9 has been operated and confirms the occurrence of the trigger mentioned above, a character "S" is appended to the head of the folder name of the backup power source folder.

In Step b6, for example, when the CPU 11 recognizes that the G sensor output value has exceeded the threshold Gmax or Gmin and determines that the trigger mentioned above occurred at 3:32:15 p.m., Sep. 5, 2006, a backup power source folder named "G060905153215-A" is created on the CF card 3.

In Step b7, under no-power circumstances, at least part of the still image information stored in the second SD-RAM 32 is recorded in the backup power source folder created in Step b6, with use of the electric power supplied from the backup power source section 27. More specifically, under no-power circumstances, with reference to the time point of occurrence of trigger $T_G$, certain still image information of frames recently having been stored including the frame which has been stored in the second SD-RAM 32 at the time point of occurrence of trigger $T_G$ is recorded on the CF card 3 successively in reverse chronological order from the time point of occurrence of trigger $T_G$. After that, the operation procedure comes to an end.

In Step b8, it is determined whether or not the recording operation to record the still image information stored in the second SD-RAM 32 in the vehicle power source folder has come to an end. When the recording operation has come to an end, the operation procedure is completed. On the other hand, when the recording operation has not come to an end, the operation procedure goes back to Step b3 to perform the recording operation to record the still image information stored in the second SD-RAM 32 in the vehicle power source folder.

As has been describe above, according to the present embodiment, in a case where the vehicle is involved in an accident and thus the electric power supply from the vehicle power source section 50 is interrupted due to the impact caused by the accident, the CPU 11 thereupon starts to receive electric power supply from the backup power source section 27. At this time, the vehicle information stored in the second SD-RAM 32 is so recorded on the CF card 3 that it is possible to determine the recording on the CF card 3 has been performed with use of the electric power supplied from the backup power source section 27.

Accordingly, in the case of displaying, out of plural pieces of vehicle information which is recorded on the CF card 3 and is loaded into, for example, a personal computer (PC for short), on a display screen of the PC vehicle information recorded on the CF card 3 with use of the electric power supplied from the backup power source section 27, the user can easily and promptly determine whether certain vehicle information thus displayed is the vehicle information which has been recorded on the CF card 3 with use of the electric power supplied from the backup power source section 27 or not, only by identifying the loaded plural pieces of vehicle information mentioned above by the eye. In this way, the user can easily make a confirmation, for example, by checking the display screen of the PC where is displayed the vehicle information which has been recorded on the CF card 3 with use of the electric power supplied from the backup power source section 27.

In addition, different from the aforementioned related art, it is not necessary for the user to check all the vehicle information loaded into the PC one by one so as to search for the vehicle information recorded on the CF card 3 with use of the electric power supplied from the backup power source section 27. Accordingly, it is possible to save the user some trouble in searching for the vehicle information recorded on the CF card 3.

Further, according to the present embodiment, upon a switch to electric power supply from the backup power source section 27, predetermined identification information "−A" is appended to the folder name of the vehicle power source folder where the still image information serving as the vehicle information is recorded in the presence of electric power supply from the vehicle power source section 50, whereby a backup power source folder is created on the CF card 3 as a new folder. Moreover, part of the still image information stored in the second SD-RAM 32 is recorded in the aforementioned backup power source folder on the CF card 3.

Accordingly, in the case of displaying and thus confirming, out of plural pieces of vehicle information which is recorded on the CF card 3 and is loaded into, for example, a personal computer (PC for short), vehicle information which has been recorded on the CF card 3 in the presence of the electric power supply from the backup power source section 27, the user may only search for the backup power source folder with a folder name created by the addition of predetermined identification information. Accordingly, the user can determine easily and promptly whether or not the backup power source folder exists. And further, when the backup power source folder exists, the user can select this folder, whereby it is possible to easily confirm the still image information recorded in the presence of electric power supply from the backup power source section 27.

In this way, different from the aforementioned related art, it is not necessary for the user to confirm all the vehicle information loaded into the PC one by one so as to search for the vehicle information which has been recorded on the CF card 3 in the presence of electric power supply from the backup power source section 27. Accordingly, it is possible for the user to confirm, within a comparatively shorter period of time, the still image information which has been recorded in the presence of electric power supply from the backup power source section 27.

Further, according to the present embodiment, under the control of CPU 11, when a backup power source folder is created as a new folder on the CF card 3, a folder name of the backup power source folder is determined according a predetermined regulation in a manner that predetermined identification information is appended to the tail end of this folder name. As has been described, according to the predetermined regulation, for example, the identification information for identifying the vehicle power source folder is added to the tail end of the folder name determined on the basis of time and date of occurrence of trigger, whereby, in the case of arranging folders loaded into the PC in chronological order and displaying the folders on the display screen of the PC by a list, for example, the backup power source folder is displayed in the close vicinity of the vehicle power source folder of event related thereto.

Accordingly, the user can easily recognize that the vehicle power source folder displayed in the close vicinity of a desired backup power source folder is a folder of event related to the aforementioned backup power source folder. In this way, it is possible to save the user the trouble of searching for the vehicle power source folder related to the desired backup power source folder. Moreover, on the basis of the still image information included in these folders related to each other, it is possible to promptly analyze the state of the accident and the driving conditions of the vehicle, for example.

Figure 12:
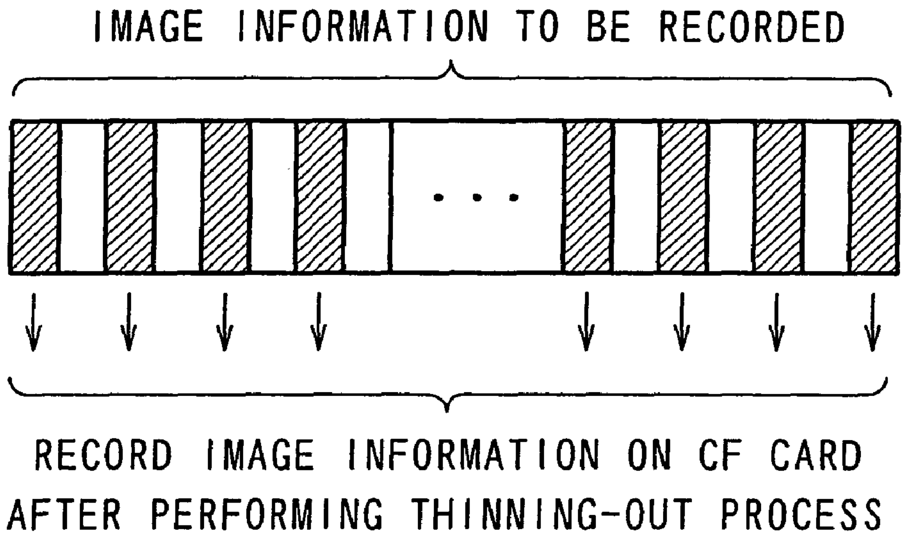
FIG. 12 is a view of assistance in explaining execution of a second recording operation for a case where certain still image information stored in the second SD-RAM after the thinning-out of the still image information is recorded on the CF card.

FIG. 12 is a view of assistance in explaining execution of a second recording operation for a case where certain still image information stored in the second SD-RAM 32 after the thinning-out of the still image information is recorded on the CF card 3.

Under normal circumstances, the CPU 11 performs a first recording operation in a manner that in the vehicle power source folder created on the CF card 3 is recorded the still image information that has been stored in the second SD-RAM 32 within a predetermined period of time including the time at which the signal indicative of the instruction to store the still image information stored in the second SD-RAM 32 was provided, with reference to the time point of occurrence of trigger $T_G$ successively in the order in which the frames were stored in the second SD-RAM 32.

Under no-power circumstances, the CPU 11 performs a second recording operation, which is different from the first recording operation, in a manner that at least part of the still image information stored in the second SD-RAM 32, specifically, that part of the still image information stored in the second SD-RAM 32 which remains after thinning out part of the frames from the still image information, can be stored in the backup power source folder newly created on the CF card 3, with use of the electric power supplied from the backup power source section 27.

The present embodiment is so designed that, under normal circumstances, 10 frames of still images can be recorded on the CF card 3 in one second, and that, under no-power circumstances, the thinning-out of the frames is made every a predetermined number of the frames whereby to record 5 frames of still images on the CF card 3 in one second.

As has been described above, according to the present embodiment, vehicle information concerning a vehicle is stored in the second SD-RAM 32 in a cyclic manner. Under the control of the CPU 11, when the predetermined condition has been fulfilled, for example, when the G sensor output value representing acceleration of gravity exerted in the anteroposterior direction of the vehicle and acceleration of gravity exerted in the lateral direction of the vehicle has exceeded the predetermined threshold, the vehicle information stored in the second SD-RAM 32 is recorded on the CF card 3. The backup power source section 27 backups the electric power supply from the vehicle power source section 50 to the CPU 11. When a power source for supplying electric power to the CPU 11 is changed from the vehicle power source section 50 to the backup power source section 27, the CPU 11 effects control in a manner that part of the vehicle information stored in the second SD-RAM 32 is recorded in the backup power source folder created on the CF card 3.

The part of the information mentioned above corresponds to information which can be recorded during a period of time within which the backup power source section 27 can supply electric power to the CPU 11. More specifically, the part of the information mentioned above has an amount of information (data) capable of being recorded on the CF card 3 in the period of time within which the backup power source section 27 can supply electric power to the CPU 11.

Accordingly, under the control of the CPU 11, even in the absence of electric power supply from the vehicle power source section 50, part of the vehicle information stored in the second SD-RAM 32 can be recorded in the backup power source folder created on the CF card 3 without fail, with use of the electric power supplied from the backup power source section 27.

Further, as has been described above, according to the present embodiment, when the signal indicative of the instruction to record the still image information taken by the camera 6 is given and when the main power source's power detection portion 52 detects the presence of electric power supply from the vehicle power source section 50, the CPU 11 performs the first recording operation in a manner that still image information which has been stored frame by frame in the second SD-RAM 32 within a predetermined period of time including the time point at which the instruction was given, is recorded in the vehicle power source folder created on the CF card 3, successively in the order in which the frames were stored in the second SD-RAM 32.

Further, when the signal indicative of the instruction to record the still image information taken by the camera 6 is given and when the main power source's power detection portion 52 detects the absence of electric power supply from the vehicle power source section 50, the CPU 11 performs the second recording operation, which is different from the first recording operation, in a manner that at least part of the still image information stored frame by frame in the second SD-RAM 32 can be stored in the backup power source folder on the CF card 3, with use of the electric power supplied from the backup power source section 27. To be specific, the CPU 11 performs the second recording operation in a manner that, out of the still image information stored frame by frame in the second SD-RAM 32, that part of the still image information stored in the second SD-RAM 32 which remains after thinning out part of the frames from the still image information, can be stored in the backup power source folder on the CF card 3.

By doing so, for example, even in a case where the vehicle is involved in an accident and thus electric power supply from the vehicle power source section 50 is interrupted due to the impact caused by the accident, that part of the still image information stored in the second SD-RAM 32 which remains after thinning out part of the frames from the still image information, can be recorded in the backup power source folder created on the CF card 3 without fail, with use of the electric power supplied from the backup power source section 27. Accordingly, it is possible to specifically analyze, for example, the state of the accident and the driving conditions of the vehicle, on the basis of the still image information recorded in the backup power source folder created on the CF card 3.

Further, for example, that part of the still image information stored in the second SD-RAM 32 which remains after thinning out part of the frames from the still image information every a predetermined number of frames, is recorded in the backup power source folder created on the card 3, whereby it is possible to maintain temporal relation of the frames stored in a predetermined period of time including the time point at which the signal indicative of the instruction to record the still image information taken by the camera 6 was given. Accordingly, even when the still image information recorded in the backup power source folder of the CF card 3 is the still image information which remains after thinning out part of the frames every a predetermined number of frames, it is possible to easily grasp and analyze the state of the accident and the driving conditions of the vehicle comparatively.

Figure 13:
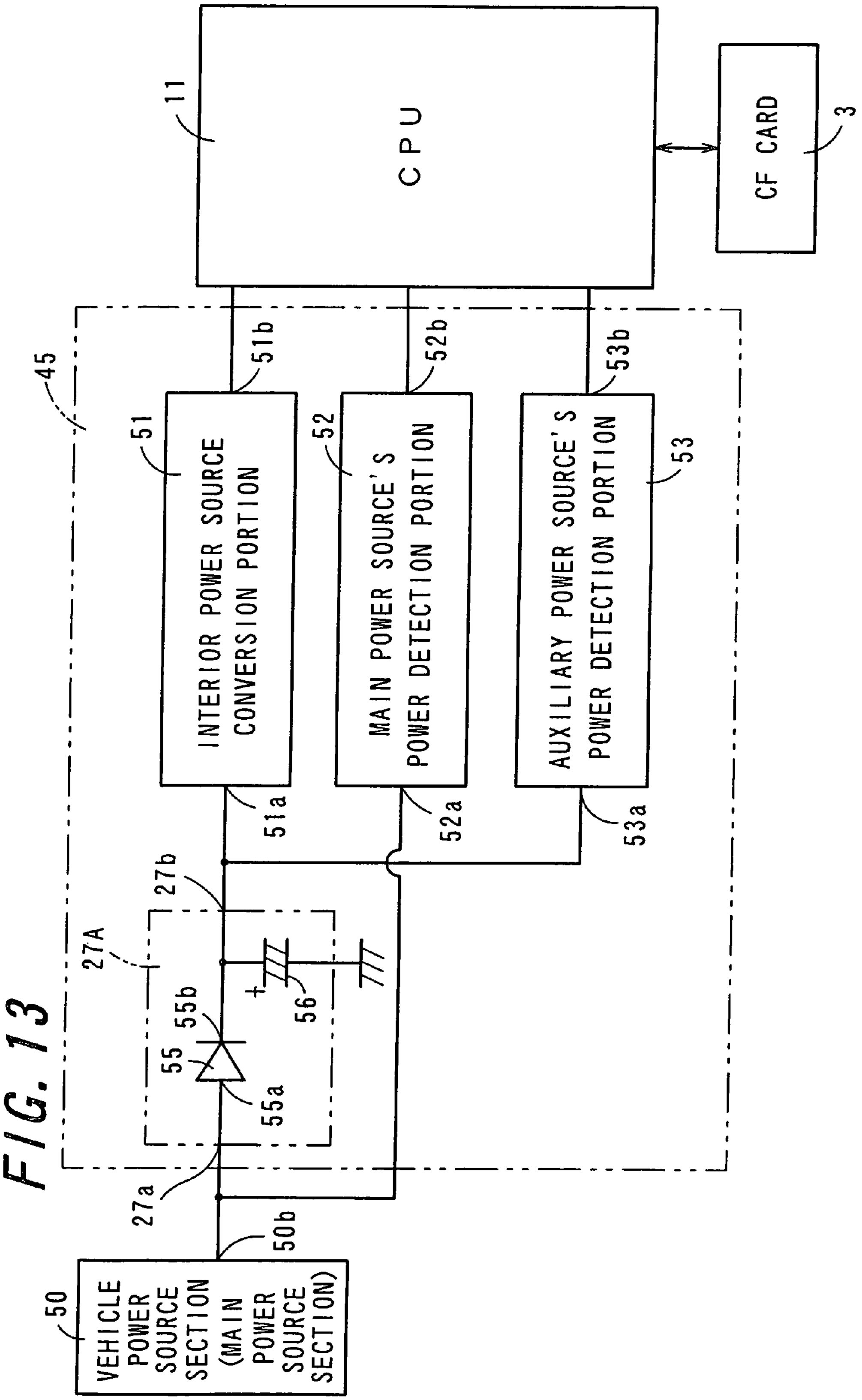
FIG. 13 is a block diagram showing a part of the configuration of the drive recorder according to another embodiment of the invention.

Next, descriptions will be given to a drive recorder according to another embodiment of the invention. FIG. 13 is a block diagram showing a part of the configuration of the drive recorder according to another embodiment of the invention. The drive recorder of the present embodiment is provided with a backup power source section 45 configured differently from the backup power source section 27 shown in FIG. 1. The backup power source section 45 serving as an auxiliary power source section is composed of a backup circuitry portion 27A, an interior power source conversion portion 51, a main power source's power detection portion 52 serving as an electric power detection portion, and an auxiliary power source's power detection portion 53 serving as a detection portion.

The configurations and functions of the respective backup circuitry portion 27A, the interior power source conversion portion 51, and the main power source's power detection portion 52 of this embodiment are the same as those of the backup circuitry portion 27A of the preceding embodiment as shown in FIG. 7. Therefore, those constituent components will be identified with the same reference symbols, and overlapping descriptions will be omitted. In addition, the backup power source section 45 according to the present embodiment is similar in structure to the aforementioned backup power source section 27 as shown in FIG. 7, and therefore, only the points of difference will be described hereinbelow.

An output part 27*b* of the backup circuitry portion 27A, more specifically, a point of connection between a cathode 55*b* of a diode 55 and a positive terminal of a capacitor 56, is electrically connected to an input part 51*a* of the interior power source conversion portion 51 as well as an input part 53*a* of the auxiliary power source's power detection portion 53. An output part 53*b* of the auxiliary power source's power detection portion 53 is electrically connected to the CPU 11.

The auxiliary power source's power detection portion 53 detects a voltage value or a current value outputted from the backup circuitry portion 27A, and provides a result of the detection to the CPU 11. The CPU 11 determines whether or not the still image information stored in the second SD-RAM 32 can be recorded on the CF card 3, on the basis of the voltage value or the current value provided from the auxiliary power source's power detection portion 53. When it is determined that the still image information stored in the second SD-RAM 32 can be recorded on the CF card 3, the CPU 11 performs a second recording operation in a manner that, as already described in FIG. 8, certain still image information is recorded on the CF card 3 successively in reverse chronological order, or in a manner that, as already described in FIG. 12, certain still image information after the thinning-out of the still image information is recorded on the CF card 3.

Figure 14:
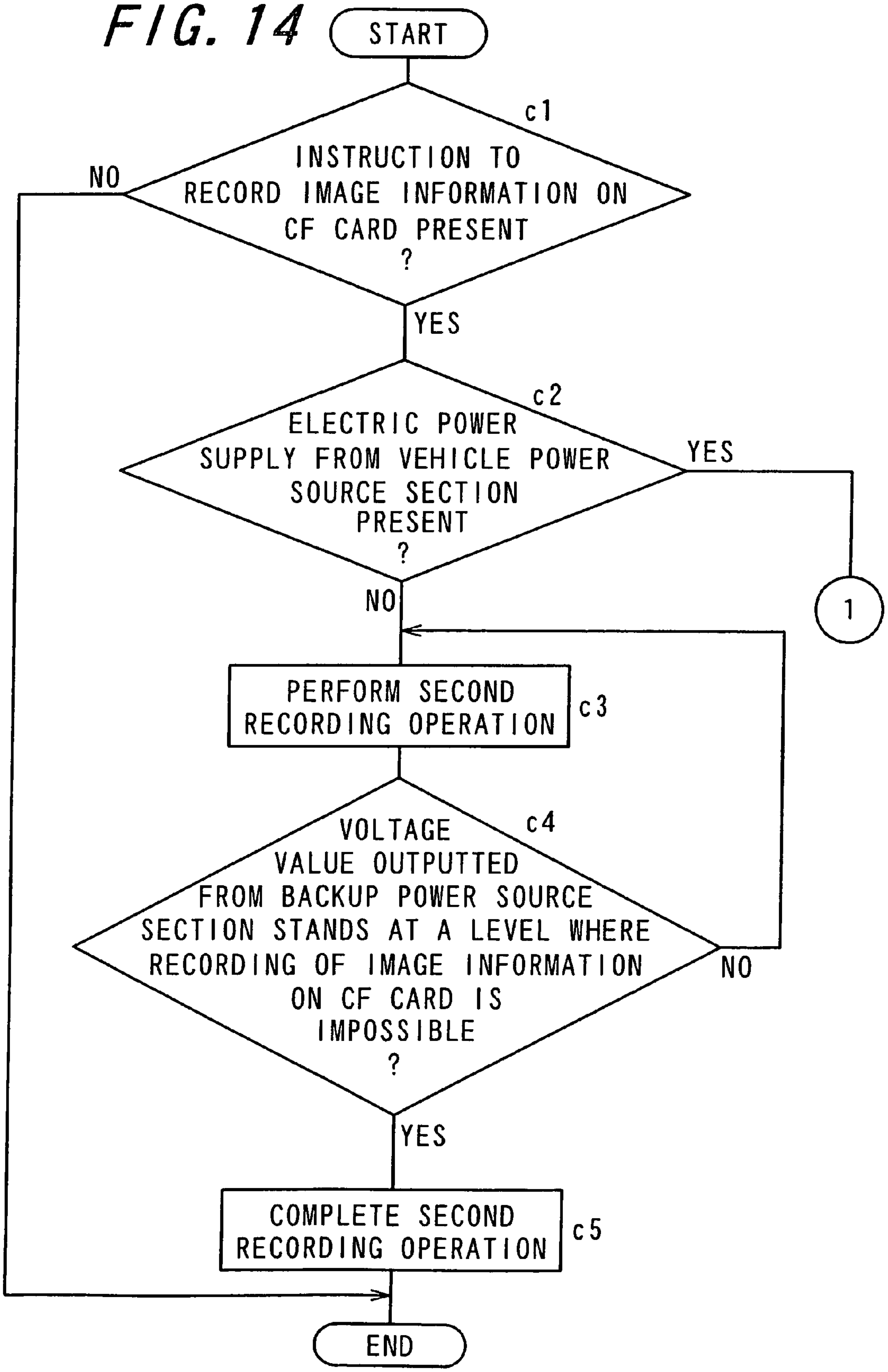
FIG. 14 is a flowchart showing an operation procedure to be followed by the CPU with regard to the operation to complete the recording of still image information on the CF card.

FIG. 14 is a flowchart showing an operation procedure to be followed by the CPU 11 with regard to the operation to complete the recording of still image information on the CF card 3. In the flowchart shown in FIG. 14, the operation procedure is started on condition that the drive recorder main body 5 is powered up. The operation procedure is performed under the control of the CPU 11. Upon the start-up of the operation, the operation procedure goes to Step c1.

The process of Step c1 is the same as that of Step a1 shown in FIG. 10, and the process of Step c2 is the same as that of Step a2 shown in FIG. 10. Therefore, detailed descriptions of Steps c1 and c2 will be omitted. When it is determined in Step c2 that electric power is being supplied from the vehicle power source section 50, the operation procedure goes to Step c6. The process of Step c6 is the same as that of Step a3 of the flowchart shown in FIG. 10, detailed descriptions of the Step c6 will be omitted.

In Step c3, the second recording operation is performed in a manner that, as already described in FIG. 8, certain still image information stored in the second SD-RAM 32 is recorded in reverse chronological order in a backup power source folder created on the CF card 3, or in a manner that, as already described in FIG. 12, certain still image information is recorded in a backup power source folder created on the CF card 3 after the thinning-out of the still image information. Following the completion of the second recording operation, the operation procedure goes to Step c4.

In Step c4, it is determined whether or not the voltage value or the current value fed from the backup power source section 27, which has been provided from the auxiliary power source' power detection portion 53, stands at a level where the recording of the still image information stored in the second SD-RAM 32 on the CF card 3 is impossible. When the recording of the still image information on the CF card 3 is found to be impossible, the operation procedure goes to Step c5. On the other hand, when the recording of the still image information on the CF card 3 is found to be possible, the operation procedure goes back to Step c3, and the above-described second recording operation is thereupon performed.

In Step c5, the second recording operation of Step c3 is brought to an end. Following the completion of Step c5, the operation procedure comes to an end.

Note that, while there is being performed the second recording operation to record the still image information stored in the second SD-RAM 32 to the backup power source folder created on the CF card 3 with use of the electric power supplied from the backup power source section 27, the interruption of the electric power supply from the backup power source section 27 may thereupon cause such problems that the still image information stored at the time point when the supply of electric power was interrupted cannot be read out and that the corruption of the recorded still image information takes place.

Accordingly, the present embodiment is so designed that it is determined whether or not the power supply from the backup power source section 27 is interrupted, while the second recording operation is being performed. More specifically, as seen from Step c4 shown in the flowchart of FIG. 14, the CPU 11 determines whether or not the value of voltage or the value of current fed from the backup power source section 27, which has been provided from the auxiliary power source's power detection portion 53, stands at a level where the recording of the still image information stored in the second SD-RAM 32 on the CF card 3 is impossible. When it is determined that the recording of still image information on the CF card 3 is impossible, the second recording operation comes to an end.

In this way, it is possible to prevent the occurrence of such problems, which are resulted from the interruption the electric power supply from the backup power source section 27 when the second recording operation is being performed, that the still image information recorded at the time when the supply of electric power was interrupted cannot be read out and that the corruption of the recorded still image information takes place.

Figure 15:
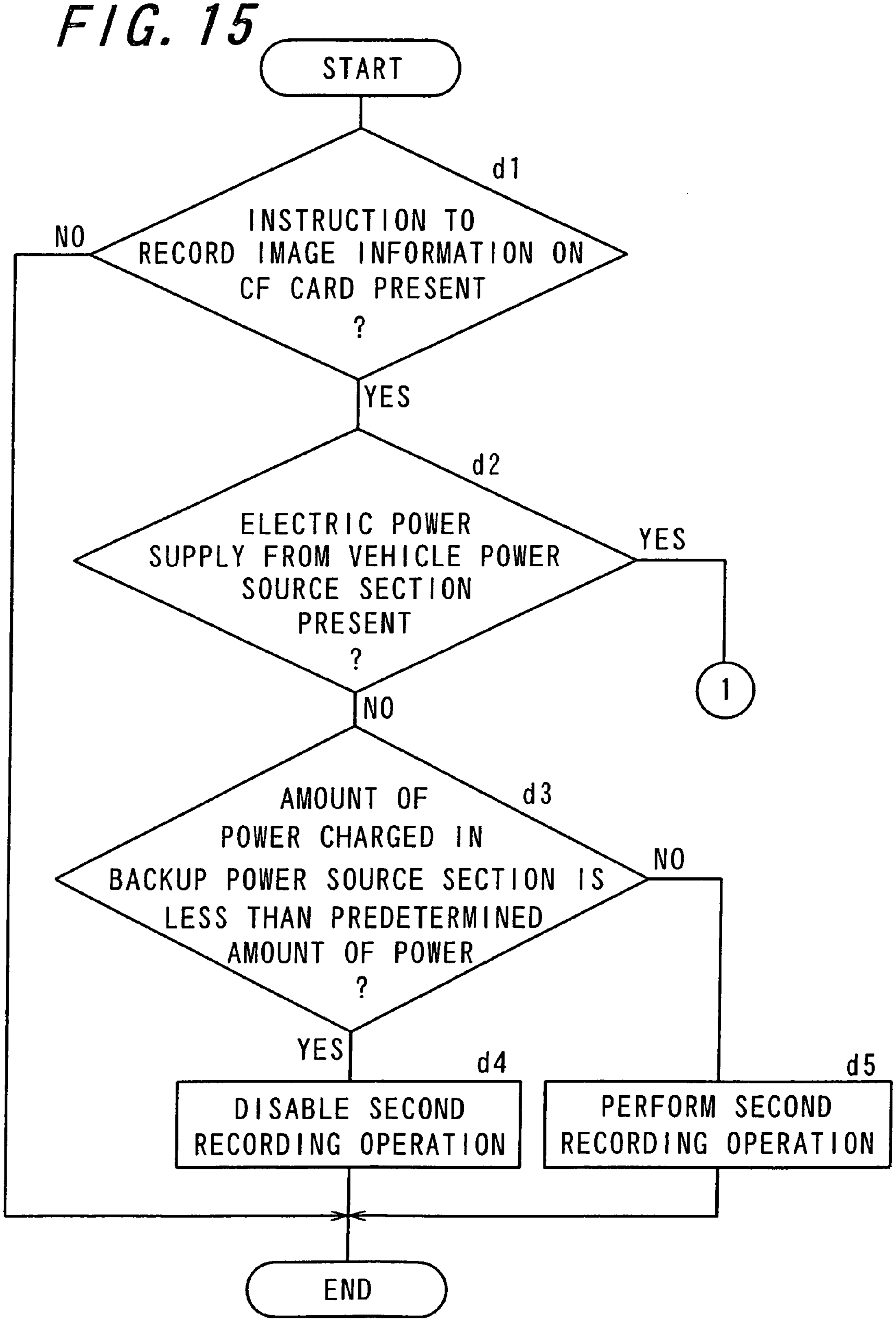
FIG. 15 is a flowchart showing an operation procedure followed by the CPU with regard to the operation to disable the recording of the still image information on the CF card.

FIG. 15 is a flowchart showing an operation procedure followed by the CPU 11 with regard to the operation to disable the recording of the still image information on the CF card 3. In the flowchart shown in FIG. 15, the operation is started on condition that the drive recorder main body 5 is powered up. Upon the start-up of the operation, the operation procedure goes to Step d1.

The process of Step d1 is the same as that of Step a1 shown in FIG. 10, and the process of Step d2 is the same as that of Step a2 shown in FIG. 10. Therefore, detailed descriptions of Steps d1 and d2 will be omitted. When it is determined in Step d2 that electric power is being supplied from the vehicle power source section 50, the operation procedure goes to Step d6. The process of Step d6 is the same as that of Step a3 of the flowchart shown in FIG. 10, detailed description of Step d6 will be omitted.

In Step d3, it is determined whether or not an amount of electric power charged in the backup power source section 27 (hereinafter, occasionally referred to as "amount of charged power") is less than a predetermined amount of power. When the amount of charged power is less than the predetermined amount of power, the operation procedure goes to Step d4. On the other hand, when the amount of charged power is greater than the predetermined amount of power, the operation procedure goes to Step d5. In the embodiment, the predetermined amount of power is an amount of power required to record, out of the still image information stored in the second SD-RAM 32, 1 frame of still image on the CF card 3.

In Step d4, there is effected the disabling of the second recording operation to, as has already been described with reference to FIG. 8, create the backup power source folder on the CF card 3 and record certain still image information stored in the second SD-RAM 32 in the created backup power source folder successively in reverse chronological order, or the second recording operation to, as has been already described with reference to FIG. 12, record certain still image information stored in the second SD-RAM 32 in the created backup power source folder after the thinning-out of the still image information. Following the completion of Step d4, the operation procedure comes to an end.

In Step d5, the above-described second recording operation is performed. Following the completion of Step d5, the operation procedure comes to an end.

According to the preceding embodiment, with use of the electric power supplied from the backup power source section 27, the second recording operation is effected to the recording of the still image information stored in the second SD-RAM 32 in the backup power source folder created on the CF card 3. However, note that, when the second recording operation is performed in a case where the amount of charged power is less than the predetermined amount of power, there will arise such problems that the still image information stored in the second SD-RAM 32 cannot be recorded in the backup power source folder of the CF card 3, and that, although the recording itself has been finished somehow, the corrupted still image information is recorded undesirably.

In view of the above-described problems, in the present embodiment, before performing the second recording operation to record the still image information stored in the second SD-RAM 32 in the backup power source folder of the CF card 3 with use of the electric power supplied from the backup power source section 27, as seen in Step d3 of the flowchart shown in FIG. 15, the CPU 11 determines whether or not the amount of power charged in the backup power source section 27 is less than the predetermined amount of power. When the CPU 11 determines that the amount of power charged in the backup power source section 27 is less than the predetermined amount of power, the second recording operation is disabled.

By doing so, it is possible to prevent the occurrence of such problems that the second recording operation is undesirably performed in a case where the amount of electric power charged in the backup power source section 27 is less than the predetermined amount of power, that the still image information stored in the second SD-RAM 32 cannot be recorded on the CF card 3, and that, although the recording itself is finished somehow, corrupted still image information is undesirably recorded on the CF card 3.

Figure 16:
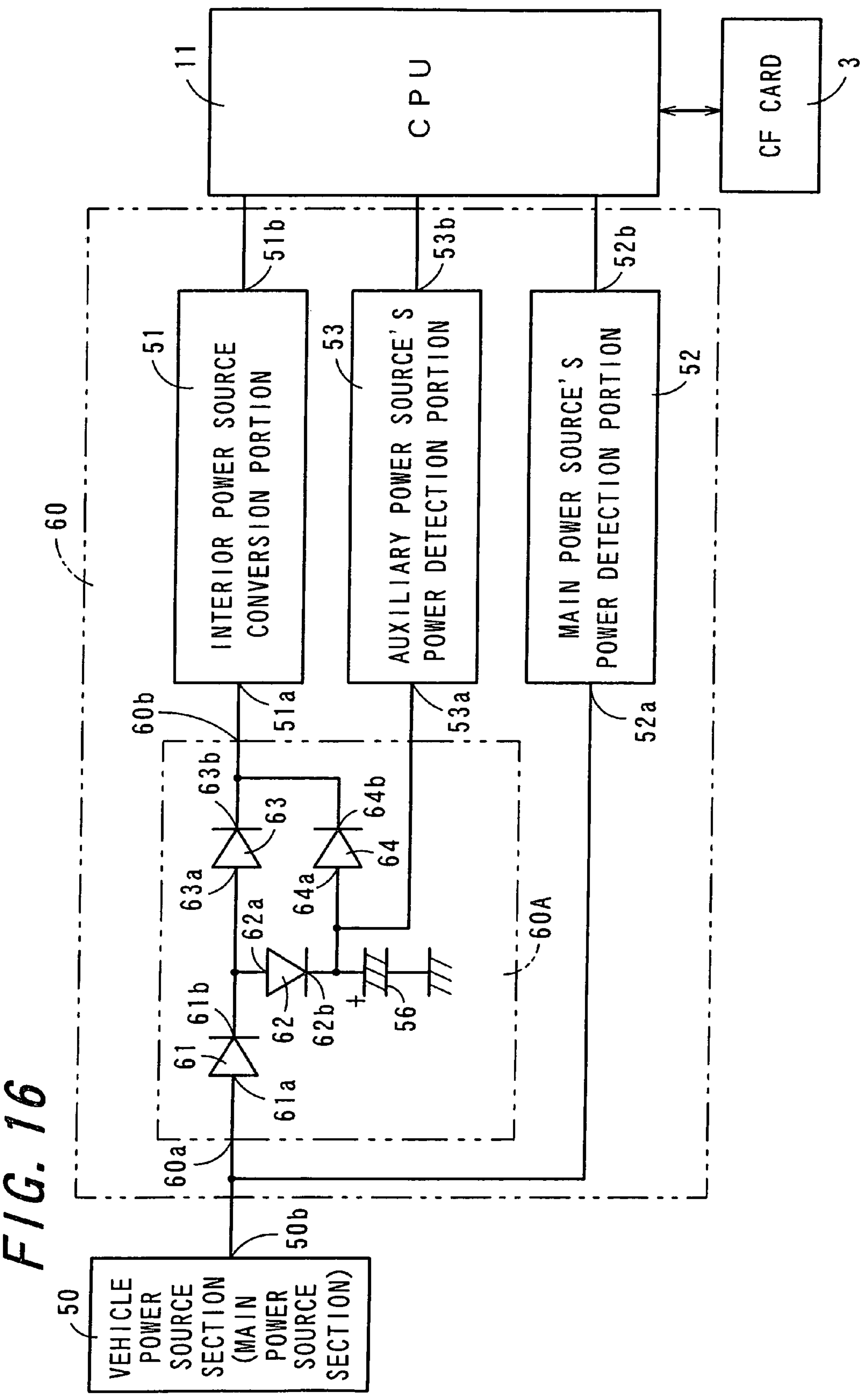
FIG. 16 is a block diagram showing a part of the configuration of the drive recorder according to still another embodiment of the invention.

Next, descriptions will be given to the drive recorder 1 according to still another embodiment of the invention. FIG. 16 is a block diagram showing a part of the configuration of the drive recorder according to still another embodiment of the invention. The drive recorder of the present embodiment is provided with a backup power source section 60 configured differently from the backup power source section 27 shown in FIG. 1. The backup power source section 60 serving as an auxiliary power source section is composed of a backup circuitry portion 60A, an interior power source conversion portion 51, a main power source's power detection portion 52 serving as an electric power detection portion, and an auxiliary power source's power detection portion 53 serving as a detection portion.

The configurations and functions of the interior power source conversion portion 51, the main power source's power detection portion 52, and the auxiliary power source's power detection portion 53 of this embodiment are the same as those of the interior power source conversion portion 51, the main power source's power detection portion 52, and the auxiliary power source's power detection portion 53 shown in FIG. 12. Therefore, those constituent components in the backup power source section 60 will be identified with the same reference symbols, and the description thereof will be omitted. In addition, the backup power source section 60 is similar in structure to the above-described backup power source section 45 shown in FIG. 13, and the only difference between thereof is the configuration of the backup circuitry portion 60A. Consequently, only the configuration of the backup circuitry portion 60A will be described hereinbelow.

The backup circuitry portion 60A according to the present embodiment is composed of a first diode 61, a second diode 62, a third diode 63, a fourth diode 64, and a capacitor 56. More specifically, an output portion 50*b* of the vehicle power source section 50 is electrically connected to an anode 61*a* of the first diode 61. A cathode 61*b* of the first diode 61 is electrically connected to an anode 62*a* of the second diode 62 and also to an anode 63*a* of the third diode 63.

A cathode 62*b* of the second diode 62 is connected to a positive terminal of the capacitor 56 where an earth terminal is connected to the ground. A point of connection between the cathode 62*b* of the second diode 62 and the positive terminal of the capacitor 56 is electrically connected to an anode 64*a* of the fourth diode 64 and also to an input part 53*a* of the auxiliary power source's power detection portion 53. A cathode 63*b* of the third diode 63 and a cathode 64*b* of the fourth diode 64 are each electrically connected to the interior power source conversion portion 51.

Also in the above-described embodiment including the backup power source section 60 shown in FIG. 16, just as is the case with the preceding embodiment shown in FIG. 13, the operations according to the flowcharts shown in FIGS. 14 and 15 can be performed, and the same effect as achieved in the above-described embodiment shown in FIG. 13 can be achieved.

A still another embodiment of the invention relates to a program for making a computer function as the CPU 11 which serves as a recording control section. The program as has been described is implemented by the computer. In this way, the computer functions as the CPU 11 serving as the recording control section. In the present embodiment, the same effect as achieved in the above-described respective embodiments can also be achieved.

A still another embodiment of the invention relates to a computer-readable recording medium that stores the aforementioned program. The recording medium may be achieved by a flexible disk and a CD-ROM (Compact Disc-Read Only Memory), for example. The aforementioned program stored by the recording medium can be read and executed by the computer, whereby the same effect as achieved in the above-described respective embodiments shown in FIGS. 1-16 can be achieved.

Note that the embodiments thus far described are considered as illustrative only of the invention, and therefore modifications and changes may be made in the constructions of the embodiments within the scope of the invention. Although the above description deals with the embodiments of the drive recorder designed to perform, as the second recording operation, the recording of that part of the still image information stored in the second SD-RAM 32 which remains after thinning out a part of the frames therefrom on the CF card 3, the invention is not necessarily limited to such a construction.

According to another embodiment of the invention, the drive recorder may be so designed as to effect, as the second recording operation, such a recording operation as described hereinbelow. That is, out of that part of the still image information stored in the second SD-RAM 32 which remains after thinning out a part of the frames therefrom, certain frames recently having been stored including the frame which has been stored in the second SD-RAM 32 at the time point of occurrence of trigger $T_G$ are recorded in the backup power source folder created on the CF card 3 successively in reverse chronological order, with the time point of occurrence of trigger $T_G$ as the reference. Also in such an embodiment designed as has been described, the same effect as achieved in the above-described embodiments shown in FIGS. 8 and 12 can be achieved.

The backup power source section 27 according to the above-described embodiment shown in FIG. 7 is composed of the backup circuitry portion 27A, the interior power source conversion portion 51, and the main power source's power detection portion 52. In other words, the backup power source section 27 is composed of a combination of the backup circuitry portion 27A, the interior power source conversion portion 51, and the main power source's power detection portion 52 in a single-piece construction. However, the invention is not limited to such configuration as has been described. By way of another embodiment of the invention, the backup circuitry portion 27A, the interior power source conversion portion 51, and the main power source's power detection portion 52 may be disposed separately from one another.

The backup power source section 45 according to the above-described embodiment shown in FIG. 13 is composed of the backup circuitry portion 27A, the interior power source conversion portion 51, the main power source's power detection portion 52, and the auxiliary power source's power detection portion 53. In other words, the backup power source section 45 is composed of a combination of the backup circuitry portion 27A, the interior power source conversion portion 51, the main power source's power detection portion 52, and the auxiliary power source's power detection portion 53 in a single-piece of construction. However, the invention is not limited to such configuration as has been described. By way of another embodiment of the invention, the backup circuitry portion 27A, the interior power source conversion portion 51, the main power source's power detection portion 52, and the auxiliary power source's power detection portion 53 may be disposed separately from one another.

The backup power source section 60 according to the above-described embodiment shown in FIG. 16 is composed of the backup circuitry portion 60A, the interior power source conversion portion 51, the main power source's power detection portion 52, and the auxiliary power source's power detection portion 53. In other words, the backup power source section 60 is composed of a combination of the backup circuitry portion 60A, the interior power source conversion portion 51, the main power source's power detection portion 52, and the auxiliary power source's power detection portion 53 in a single-piece construction. However, the invention is not limited to such configuration as has been described. By way of another embodiment of the invention, the backup circuitry portion 60A, the interior power source conversion portion 51, the main power source's power detection portion 52, and the auxiliary power source's power detection portion 53 may be disposed separately from one another.

The above-described embodiment shown in FIG. 8 is so designed that, under circumstances where a signal indicative of the instruction to record the still image information taken by the camera 6 is given and where the main power source's power detection portion 52 detects the absence of the electric power supply from the vehicle power source section 50, with use of the electric power supplied from the backup power source section 27, at least part of the still image information stored frame by frame in the second SD-RAM 32, more specifically, certain still image information of frames recently having been stored including the frame which has been stored in the second SD-RAM 32 at the time point of occurrence of trigger $T_G$, is recorded in the backup power source folder created on the CF card 3 successively in reverse chronological order from the time point of occurrence of trigger $T_G$. However, the invention is not limited to such a design as has been described.

Another embodiment of the invention may be so designed that, under circumstances where a signal indicative of the instruction to record the audio information inputted from the mike 7 is given and where the main power source's power detection portion 52 detects the absence of electric power supply from the vehicle power source section 50, with use of the electric power supplied from the backup power source section 27, at least part of the audio information stored in the second SD-RAM 32, to be specific, with the time point of occurrence of trigger $T_G$ as the reference, certain audio information recently having been stored including audio information which has been stored in the second SD-RAM 32 at the time point of occurrence of trigger $T_G$ is recorded in the backup power source folder successively in reverse chronological order from the time point of occurrence of trigger $T_G$.

The above-described embodiments are so designed that, in order to be able to determine that, upon a switch to electric power supply from the backup power source section 27, the recording on the CF card 3 is performed with use of the electric power supplied from the backup power source section 27, the predetermined identification information "–A" is appended to the folder name of the vehicle power source folder where the still image information serving as vehicle information is stored in the presence of electric power supply from the vehicle power source section 50, whereby to create a backup power source folder on the CF card 3 as a new folder. And moreover, a part of the still image information stored in the second SD-RAM 32 is recorded in the aforementioned backup power source folder created on the CF card 3. However, the target to which identification information is added is not necessarily limited to the aforementioned folder name, as long as the user can identify the target by the eye.

Another embodiment of the invention may be so designed that, predetermined identification information is added to a file including information corresponding to one event, to be specific, still image information, G sensor output values, positional information, time information, and vehicle speed information. Also in this case, the same effect as achieved in the above-described embodiments can be achieved.

In another embodiment of the invention, the time point of start of no-power circumstances $T_{OFF}$ may be adopted as the reference, instead of the time point of occurrence of trigger $T_G$, in the second recording operation to record on the CF card 3 under no-power circumstances. That is, upon the detection of no-power circumstances, namely upon the detection of absence of electric power supply from the vehicle power source 50 during the recording of the still image information stored in the second SD-RAM 32 on the CF card 3 after the detection of trigger, the still image information of frames that were stored in the second SD-RAM 32 from a predetermined time (for example, twelve seconds, ten seconds, or five seconds) before the time point of start of no-power circumstances $T_{OFF}$, to the time point of start of no-power circumstances $T_{OFF}$, is recorded on the CF card 3 successively in reverse chronological order from the time point of start of no-power circumstances $T_{OFF}$. Take FIG. 9(4) as an example, the still image information is recorded on the CF card 3 successively in the order of frame N, frame M, . . . frame J, frame I, . . . . In this way, on the CF card 3 are recorded images which were stored at and before the time point of start of no-power circumstances $T_{OFF}$ and which include the images stored at and before the time point of occurrence of trigger $T_G$. This results in that it is possible to confirm the state at the instant when electric power supply is interrupted, thus making it possible to perform a more detailed analysis of accident causes.

In another embodiment of the invention, the second recording operation may be performed not only in a manner that, under no-power circumstances, frames stored in the second SD-RAM 32 are recorded on the CF card 3 successively in reverse chronological order, but also in a manner that, upon the detection of no-power circumstances, on the CF card 3 are recorded frames which were stored in the second SD-RAM 32 from a predetermined time (for example, twelve seconds, ten seconds, and five seconds) before the time point of occurrence of trigger $T_G$ or the time point of start of no-power circumstances $T_{OFF}$ to the time point of occurrence of trigger $T_G$ or the time point of start of no-power circumstances $T_{OFF}$, in an order in which the frames were stored in the second SD-RAM 32. In this way, when images are recorded on the CF card 3 with sounds, the sequence of occurrence of sounds is the same as the recording sequence of images, thus facilitating the recording operation.

The invention may be embodied in other specific forms without departing from the spirit or essential features thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A vehicle information recording apparatus comprising:

a first memory for recording vehicle information concerning a vehicle in a cyclic manner;

a recording control section for effecting control in a manner that the vehicle information recorded in the first memory is recorded in a second memory every time a predetermined condition is fulfilled, the recording control section being supplied with electric power from a main power source section; and an auxiliary power source section which acts as a backup for electric power supply from the main power source section to the recording control section, wherein the recording control section effects control in a manner that the vehicle information recorded in the first memory is recorded in the second memory so that it is possible to discriminate whether the recording of the vehicle information is carried out with use of electric power supplied from the main power source section or from the auxiliary power source section.

2. A vehicle information recording apparatus comprising:

a first memory for recording vehicle information concerning a vehicle in a cyclic manner;

a recording control section for effecting control in a manner that the vehicle information recorded in the first memory is recorded in a second memory every time a predetermined condition is fulfilled, the recording control section being supplied with electric power from a main power source section; and an auxiliary power source section which acts as a backup for electric power supply from the main power source section to the recording control section, wherein the recording control section effects control in a manner that the vehicle information recorded in the first memory is recorded in the second memory so that it is possible to discriminate that the recording of the vehicle information is carried out with use of electric power supplied from the auxiliary power source section.

3. A vehicle information recording apparatus comprising:

a first memory for recording vehicle information concerning a vehicle in a cyclic manner;

a recording control section for effecting control in a manner that a folder is created on a second memory and the vehicle information recorded in the first memory is recorded in the folder every time a predetermined condition is fulfilled, the recording control section being supplied with electric power from a main power source section; and an auxiliary power source section which acts as a backup for the electric power supply from the main power source section to the recording control section, wherein the recording control section effects control in a manner that a new folder is created on the second memory by adding, to a folder name of the folder, identification information whereby it is possible to discriminate that the recording of the vehicle information is carried out with use of electric power supplied from the auxiliary power source section, and part of the vehicle information recorded in the first memory is recorded in the new folder.

4. The vehicle information recording apparatus of claim 3, wherein, in creating the new folder, the recording control section determines a folder name according to a predetermined regulation, and adds the identification information to the tail end of the folder name.

5. A program stored on a non-transitory computer-readable recording medium which allows a computer to function as a recording control section for effecting control in a manner that, in the presence of electric power supply from a main power source section, a folder is created on a second memory and vehicle information concerning a vehicle recorded in a first memory in a cyclic manner is recorded in the folder every time a predetermined condition is fulfilled, and upon a switch to electric power supply from an auxiliary power source section which acts as a backup for the electric power supply from the main power source section to the recording control section, a new folder is created on the second memory, in a folder name of the new folder is added predetermined information whereby it is possible to discriminate that the recording is carried out with use of electric power supplied from the auxiliary power source section, and part of the vehicle information recorded in the first memory is recorded in the new folder.

6. A non-transitory computer-readable recording medium where the program of claim 5 has been recorded.

* * * * *